(12) United States Patent
Zaverucha et al.

(10) Patent No.: US 9,049,022 B2
(45) Date of Patent: *Jun. 2, 2015

(54) HASHING PREFIX-FREE VALUES IN A CERTIFICATE SCHEME

(75) Inventors: Gregory Marc Zaverucha, Redmond, WA (US); David William Kravitz, Fairfax, VA (US)

(73) Assignee: Certicom Corp., Mississauga, ON (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/458,382

(22) Filed: Apr. 27, 2012

(65) Prior Publication Data

US 2013/0290713 A1    Oct. 31, 2013

(51) Int. Cl.
*H04L 9/32* (2006.01)
*H04L 9/30* (2006.01)

(52) U.S. Cl.
CPC .................................. *H04L 9/3066* (2013.01)

(58) Field of Classification Search
CPC .................................................. H04L 9/3066
USPC .......................................................... 713/168
See application file for complete search history.

(56) References Cited

U.S. PATENT DOCUMENTS

| 7,593,527 | B2 * | 9/2009 | Beeson ............................. 380/30 |
| 8,375,206 | B2 * | 2/2013 | Asano et al. ................... 713/167 |
| 8,391,479 | B2 | 3/2013 | Ebeid |
| 8,458,457 | B2 * | 6/2013 | Parkinson ...................... 713/158 |
| 2004/0123111 | A1 | 6/2004 | Makita et al. |
| 2004/0193875 | A1 | 9/2004 | Aura |
| 2008/0189545 | A1 | 8/2008 | Parkinson |
| 2009/0100267 | A1 | 4/2009 | Brown et al. |
| 2010/0235633 | A1 | 9/2010 | Asano et al. |
| 2011/0087883 | A1 * | 4/2011 | Campagna et al. ............ 713/156 |
| 2011/0314294 | A1 * | 12/2011 | McGrew et al. ................ 713/182 |
| 2012/0096273 | A1 | 4/2012 | Campagna et al. |
| 2013/0067218 | A2 * | 3/2013 | Little et al. ..................... 713/156 |

OTHER PUBLICATIONS

D.R.L. Brown, R. Gallant and S.A. Vanstone. Provably secure implicit certificate schemes. Proceedings of Financial Cryptography and Data Security (FC'01), LNCS 2339 (2002), 156-165, Springer, Feb. 2001. Available at http://www.cacr.math.uwaterloo.ca/techreports/2000/corr2000-55.ps. (12 pages).

M. Campagna and G. Zaverucha. A Cryptographic Suite for Embedded Systems (SuiteE). IETF Internet Draft, Version 01, dated Apr. 19, 2011, 39 pages. Available at http://tools.ietf.org/search/draft-campagna-suitee-01.

(Continued)

*Primary Examiner* — Andrew Goldberg
(74) *Attorney, Agent, or Firm* — Fish & Richardson P.C.

(57) ABSTRACT

Methods, systems, and computer programs for producing hash values are disclosed. A prefix-free value is obtained based on input data. The prefix-free value can be based on an implicit certificate, a message to be signed, a message to be verified, or other suitable information. A hash value is obtained by applying a hash function to the prefix-free value. The hash value is used in a cryptographic scheme. In some instances, a public key or a private key is generated based on the hash value. In some instances, a digital signature is generated based on the hash value, or a digital signature is verified based on the hash value, as appropriate.

15 Claims, 5 Drawing Sheets

(56) References Cited

OTHER PUBLICATIONS

S. Coron, Y. Dodis, C. Malinaud and P. Puniya. A new Design Criteria for Hash Functions. Proceedings of CRYPTO'05, Springer 2005, (15 pages). Available at http://www.cs.nyu.edu/~dodis/ps/nist.pdf.
Ivan Damgard. A design principle for hash functions. In Gilles Brassard, editor, CRYPTO'89, vol. 435 of LNCS, pp. 416-427. Springer-Verlag, 1989.
D. Hankerson, A. Menezes and S. Vanstone. Guide to Elliptic Curve Cryptography, Springer-Verlag, New York, 2004, 332 pages.
ISO/IEC 9796-3:2006: Information technology—Security techniques—Digital signature schemes giving message recovery—Part 3: Discrete logarithm based mechanisms, 2006, 78 pages.
J. Kelsey and T. Kohno. Herding hash functions and the Nostradamus attack. In Serge Vaudenay, editor, EUROCRYPT 2006, vol. 4004 of LNCS, 17 pages. Springer-Verlag, 2006. Available at http://eprint.iacr.org/2005/281.pdf.
Ralph C. Merkle. One way hash functions and DES. In Gilles Brassard, editor, CRYPTO'89, vol. 435 of LNCS, pp. 428-446. Springer-Verlag, 1990.
G. Neven, N. Smart and B. Warinschi. Hash function requirements for Schnorr signatures. Journal of Mathematical Cryptology 3, 69-87, (2010). 19 pages. Available at http://www.zurich.ibm.com/%7Enev/papers/schnorr.pdf.
R. Housley and W. Ford and W. Polk and D. Solo. RFC 2459: Internet X.509 Public Key Infrastructure Certificate and CRL Profile. IETF RFC, Jan. 1999. 129 pages. Available at www.ietf.org/rfc/rfc2459.txt.
A. Menezes, P. van Oorschot and S. Vanstone. Handbook of Applied Cryptography, CRC Press, Boca Raton, 1997, 781 pages.
L.A. Pintsov and S.A. Vanstone. Postal revenue collection in the digital age. Proceedings of Financial Cryptography and Data Security (FC'00), LNCS 1962 (2001), 15 pages.
IEEE P1363a / D2, Standard Specifications for Public Key Cryptography: Pintsov—Vanstone Signatures with Message Recovery, Jan. 10, 2000, 9 pages.
Claus-Peter Schnorr. Efficient identification and signatures for smart cards. In Gilles Brassard, editor, CRYPTO'89, vol. 435 of LNCS, pp. 239-252. Springer-Verlag, 1990.
Claus-Peter Schnorr. Efficient signature generation by smart cards. Journal of Cryptology, 4(3):161-174, 1991.
Standards for Efficient Cryptography Group. SEC 4: Elliptic Curve Qu-Vanstone Implicit Certificate Scheme (ECQV). Draft Document, Version 0.97, Mar. 9, 2011, 32 pages.
Standards for Efficient Cryptography Group. SEC 1: Elliptic Curve Cryptography Version 2.0, May 2009, 144 pages.
ANSI X9.62-2005: Public Key Cryptography for the Financial Services Industry: The Elliptic Curve Digital Signature Algorithm (ECDSA). Accredited Standards Committee X9, Inc., 2005, 163 pages.
ANSI Draft X9.92-2007-07-06: Public Key Cryptography for the Financial Services Industry, Digital Signature Algorithms Giving Partial Message Recovery Part 1: Elliptic Curve Pintsov-Vanstone Signatures (ECPVS), Accredited Standards Committee X9, Inc., 2007. 43 pages.
SEC 2: Recommended Elliptic Curve Domain Parameters version 2.0, Standards for Efficient Cryptography Group, dated Jan. 27, 2010, 37 pages.
NIST SP 800-108, Recommendation for Key Derivation Using Pseudorandom Functions, National Institute of Standards and Technology, Oct. 2009, 21 pages.
Federal Information Processing Standards Publication (FIPS PUB) 180-2. Specifications for the Secure Hash Standard, 2002, 75 pages.
M. Campagna and G. Zaverucha. A Cryptographic Suite for Embedded Systems (SuiteE). IETF Internet Draft, Version 02, dated Oct. 18, 2011. 38 pages.
M. Campagna and G. Zaverucha. A Cryptographic Suite for Embedded Systems (SuiteE). IETF Internet Draft, Version 03, dated Apr. 9, 2012. 38 pages.
Office Action issued in U.S. Appl. No. 13/458,357 on Jul. 3, 2013; 16 pages.
Office Action issued in U.S. Appl. No. 13/458,320 on Jul. 30, 2013; 9 pages.
Office Action issued in Canadian Application No. 2,792,575 on Feb. 21, 2014; 3 pages.
Extended European Search Report issued in European Application No. 12188641.0 on May 12, 2014; 6 pages.
Ferguson, N. et al.; "Chapter 6: Hash Functions" in "Practical Cryptography", Wiley Publishing; 2003; pp. 83-95.
Andreeva, E. et al.; "Herding, Second Preimage and Trojan Message Attacks beyond Merkle-Damgard" in "Selected Areas in Cryptography"; Springer; Aug. 13, 2009; pp. 393-414.
Notice of Allowance issued in U.S. Appl. No. 13/458,357 on Jan. 28, 2014; 17 pages.
Office Action issued in U.S. Appl. No. 13/458,320 on Dec. 27, 2013; 7 pages.
Notice of Allowance issued in U.S. Appl. No. 13/458,320 on Apr. 28, 2014.
Notice of Allowance issued in U.S. Appl. No. 13/458,357 on May 22, 2014.
Platos, Jan; "Compression of Small Text Files"; vol. 22, Issue 3, Jul. 2008; pp. 410-417; ACM.
Ryu, JongHo; "Hash Function with Variable Output Length"; Publication Year 2009, pp. 600-605, IEEE Conference Publication.
Office Action issued in Canadian Application No. 2,792,572 on Feb. 20, 2014; 4 pages.
Office Action issued in Canadian Application No. 2,792,571 on Feb. 20, 2014; 5 pages.

* cited by examiner

HASHING PREFIX-FREE VALUES IN A CERTIFICATE SCHEME

BACKGROUND

This specification relates to generating hash values in a cryptography system. Cryptography systems enable secure communication over public channels. For example, digital signature schemes can be implemented in a public key cryptography system. In some cryptography systems, users verify the authenticity of other users' digital signatures based on certificates issued by a trusted third party.

BRIEF DESCRIPTION OF THE DRAWINGS

Like reference numbers in the various drawings indicate like elements.

DETAILED DESCRIPTION

Figure 1:
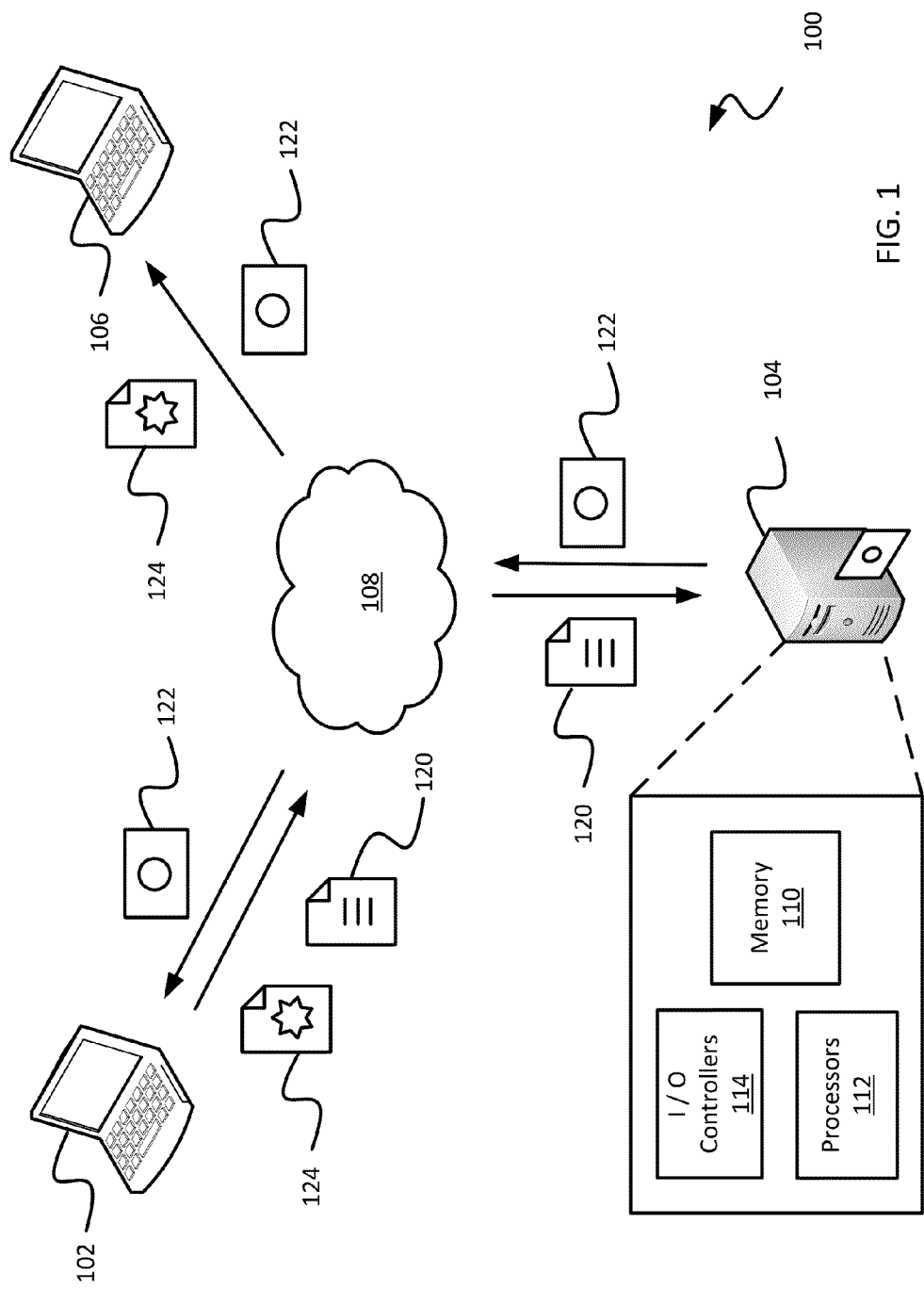
FIG. 1 is a schematic diagram of an example communication system.

In some implementations, short-output hash functions can be used in cryptographic schemes. For example, short-output hash functions may be used in signature schemes (e.g., Pintsov-Vanstone signatures, keyed Pintsov-Vanstone signatures, etc.), certificate schemes (e.g., Optimal Mail Certificate (OMC) schemes, Elliptic Curve Qu-Vanstone (ECQV) implicit certificate schemes, etc.), and other types of cryptographic schemes. In some instances, a cryptographic scheme uses one or more hash functions that produce an output having a bit-length equal to the security parameter of the cryptographic scheme. A cryptographic scheme may use a hash function that produces an output having a different bit-length. In some contexts, cryptographic schemes that can use short-output functions are preferable, for example, because digests may be transmitted with less bandwidth (e.g., half as much), because short-output hash functions may be implemented by reusing a block cipher, or because of a combination of these and other advantages.

In some implementations, a hash function can be represented as $H: \{0, 1\}^* \to \{0, 1\}^l$, where $\{0, 1\}^*$ represents a binary string of arbitrary length, and $\{0, 1\}^l$ represents a binary string of length l. In some instances, $l = \kappa$, where $\kappa$ represents the security parameter of a cryptographic scheme. One example of a hash function is AES-128-MMO, which maps $\{0, 1\}^*$ to $\{0, 1\}^{128}$. A hash function may take other forms or have different properties. Other example hash functions are the SHA-family of hash functions, MD5, and others.

The security parameter $\kappa$ is a value, typically an integer, that indicates the level of security that a cryptographic scheme is designed to provide. For example, a cryptography system operating with a security parameter of $\kappa=128$ is designed to provide 128-bit security; a cryptography system operating with a security parameter of $\kappa=256$ is designed to provide 256-bit security; etc. The security level in a cryptographic scheme generally relates to the difficulty of the underlying cryptographic problem. In some example Elliptic Curve Cryptographic (ECC) schemes, the security parameter $\kappa=t$, where $\mathbb{F}_p$ represents a prime finite field, p is an odd prime number relating to the size of the finite field, and $\log_2 p \approx 2t$. In other words, the elliptic curve cryptographic scheme is designed to supply $\kappa=t$ bits of security—meaning that solving the logarithm problem on the associated elliptic curve is believed to take approximately $2^t$ operations.

In some cases, one or more hash functions can be used in a manner that provides resistance to certain types of attacks against a cryptographic scheme. For example, to resist some types of attacks, some signature schemes require a hash value produced by a function that is collision-resistant. A hash function $H: \{0, 1\}^* \to \{0, 1\}^l$ can be collision-resistant, for example, when it is computationally intractable to find distinct inputs m and m' such that $H(m)=H(m')$. Some cryptographic schemes do not require a collision-resistant hash function.

Some cryptographic schemes require a hash value produced by a function that is random-prefix preimage (rpp) resistant, random-prefix second-preimage (rpsp) resistant, or both. A function is rpp-resistant and rpsp-resistant when the rpp problem and the rpsp problem are difficult. The problem of finding a preimage of a hash function generally means, for a given value y, find m, such that $H(m)=y$. In the random prefix preimage (rpp) problem, the adversary trying to solve the rpp problem must choose a y value, is then given a random value R, and must then find m, such that $H(R\|m)=y$. In the random-prefix second-preimage (rpsp) problem, the adversary must choose an m, is then given a random R, and must subsequently find an m', such that $H(R\|m)=H(R\|m')$.

The rpp and rpsp problems are believed to require $\kappa$ work for hash functions producing $\kappa$-bit outputs. But a "herding attack" may be used to solve the rpp and rpsp problems in $O(2^{3\kappa/4})$ time for some types of hash functions (e.g., those that have the Merkle-Damgård (MD) structure, and possibly others). The Merkle-Damgård (MD) construction is a commonly-used way to construct a hash function $H: \{0, 1\}^* \to \{0, 1\}^l$ from a compression function $h: \{0, 1\}^\mu \to \{0, 1\}^l$, for some fixed $\mu>l$. For example, common hash functions such as the SHA family and MD5 are constructed with the MD construction. As such, for some cryptographic schemes where $\kappa$ bits of security are desired, a hash function $H: \{0, 1\}^* \to \{0, 1\}^\kappa$ that produces a $\kappa$-bit hash value and has the MD structure may be insufficient to meet security requirements, in some instances.

In some implementations, a hash-based function $F: \{0, 1\}^* \to \{0, 1\}^\kappa$ that produces a $\kappa$-bit output value can be used to meet $\kappa$-bit security requirements. For example, a hash-based function F that does not have the MD structure can be used as a countermeasure against (e.g., to reduce exposure to) a herding attack or another type of attack. In some instances, a hash-based function F that produces a $\kappa$-bit hash value can be rpp-resistant, rpsp-resistant, or both. In some implementations, the example function 200 shown in FIG. 2 does not have the MD structure, produces a $\kappa$-bit output value, and can be implemented in a manner that is rpp-resistant, rpsp-resistant, or both.

In some cases, truncating the output of a hash function can remove the hash function's MD structure. For example, a $2\kappa$-bit hash value produced by a hash function having the MD structure can be truncated to a $\kappa$-bit value. This may destroy the structure instilled by the MD construction, prevent the herding attack from being effective, and remove the $O(2^{3\kappa/4})$ solution to the rpp and rpsp problems. In some scenarios, a hash function with $2\kappa$-bit outputs is not available. For example, block cipher-based hash functions, such as AES-MMO, produce a block-length output value. In some AES systems the block length is fixed at 128 bits. A hash function that produces a 2κ-bit output may not be available in such systems when κ>64 (as is typical in some systems). Moreover, in some environments hash functions that produce 2κ-bit digests may be less efficient than functions that produce κ-bit outputs, and they may require additional code.

In some implementations, one or more short-output hash functions that have the MD-structure can be modified, combined, or used in another manner to produce a different short-output function that does not have the MD-structure. The short-output function that does not have the MD-structure can be used to improve the security of PV signatures, keyed PV signatures, implicit certificates, and other schemes. In some cases, a hash function that is based on a block cipher and produces a κ-bit output can be modified to remove its MD-structure. In such cases, the modified hash function may resist the herding attack without requiring a hash function that produces a 2κ-bit output. For example, herding attacks on AES-128-MMO may be prevented, in some instances, by hashing the message m as $H(k_1 \| H(m \| k_2))$, where the keys $k_1$ and $k_2$ are public values.

In a first example, the hash function $F(m)=H(K \oplus c_1 \| H(K \oplus c_2 \| m))$ may be used, where K is a key value (which may be a public key value), $c_1$ and $c_2$ are public constants, and H is a hash function having the MD structure. Here, the operator $\oplus$ represents the bitwise exclusive-or ("XOR") operation. The order in which the bit-wise XOR operation and the concatenation operation are done does not matter. In an example, the message m can be of arbitrary length, while K, $c_1$, $c_2$ can be of 128-bits. At least one of K, $c_1$ and $c_2$ is of non-zero length. In this example, both $F: \{0, 1\}^* \rightarrow \{0, 1\}^\kappa$ and $H: \{0, 1\}^* \rightarrow \{0, 1\}^\kappa$ produce a κ-bit output; but even when H has the MD structure, F does not have the MD structure. As such, the hash function F can be used as a counter measure against certain types of attacks. This example uses the MAC construction HMAC. Because removing the MD structure may, in some contexts, be simpler than computing the secure MAC of a message, the function F in this example may be simplified, for example, to $F(m)=H(H(0^\kappa \| m))$ to obtain the same or similar advantages. Here, $0^\kappa$ represents a κ-bit string of zeros. Other constant values could be used, such as, for example, a κ-bit string of ones or a different κ-bit constant value.

In a second example, prefix-free encoding may be used. Prefix-free encoding can be accomplished by converting the hash function input to a prefix-free format. In other words, each hash function input can be reformatted, e.g., by applying a reformatting function before applying the hash function, to map the input to a value in prefix-free set. A set of strings Σ can be considered prefix-free when, for all distinct x, y ∈Σ, x is not a prefix of y. For example, fixed-length inputs will be prefix-free. Using a prefix-free encoding in the hash function can remove the MD structure.

Prefix-free encoding may be used, for example, in cases where a hash function uses a block cipher and in other cases. A hash function that uses a block cipher typically divides an input into blocks of equal length and operates sequentially on the blocks. As such, hash functions that use a block cipher typically define a fixed block-length as an operating parameter. An example of a hash function that uses a block cipher is the AES-MMO hash function, which uses an AES block cipher. In some instances, the AES-128-MMO hash function divides the input into 128-bit blocks and produces a 128-bit hash value as output. The AES-MMO hash function may operate, for example, based on sequentially applying an AES encryption function. Prefix-free encoding may be used in other cases as well.

Prefix-free encoding can be accomplished in a number of ways. For example, there are multiple different ways of converting hash function inputs to prefix-free formats. In some instances, before applying the hash function to the input, a value identifying the number of blocks in the input is prepended to the input. When a value is prepended to the input, the value is joined to the beginning of the input. Alternatively, in some instances, before hashing the input, a zero bit ("0") is appended to each block of the input, except for the last block where a one bit ("1") is appended. When a value is appended to a block, the value is joined to the end of the block. In this example, the input can first be divided into blocks that are one bit shorter than they normally would be, to leave space for the extra bit. As another alternative, before applying the hash function to the input, the input can be converted to a fixed-length input format. This can be accomplished, for example, by defining the input length as part of the system parameters in the description of the hash function. Additional or different techniques may be used.

In a third example, the hash function $F(m)=G(H(m))$ may be used, where $G: \{0, 1\}^* \rightarrow \{0, 1\}^\kappa$ and $H: \{0, 1\}^* \rightarrow \{0, 1\}^\kappa$ (or $H: \{0, 1\}^\kappa \rightarrow \{0, 1\}^\kappa$) are two different hash functions. As such, this example utilizes two distinct hash functions. Here, $F: \{0, 1\}^* \rightarrow \{0, 1\}^\kappa$, $G: \{0, 1\}^* \rightarrow \{0, 1\}^\kappa$ and $H: \{0, 1\}^* \rightarrow \{0, 1\}^\kappa$ each produce a κ-bit output. This construction may be useful, for example, in contexts where two different hash functions are available. Here, F, G, and H produce a κ-bit output; but even when H, G, or both have the MD structure, F does not have the MD structure.

Each of these three examples can be proven to be secure, for example, by showing that they are indistinguishable from a random oracle. The notion of the random oracle is captured with the following game between a challenger and attacker, for a fixed construction F (which may be any of the examples above, or another).

1. The challenger chooses ρ∈{real, ideal} at random.
2. The attacker is allowed to adaptively make queries for messages M ∈{0, 1}*, and receives responses in {0, 1}$^\kappa$. When ρ is real, the response is H (M); when ρ is ideal, the response is a random value from {0, 1}$^\kappa$. For simplicity, assume all queries are distinct.
3. The adversary outputs a guess ρ'∈{real, ideal}. The function H is said to be indistinguishable from a random oracle if no adversary can output ρ'=ρ with probability significantly different from ½.

A more technical definition can be used, for example, to model the underlying compression function h (used to construct F and H) as a random oracle or ideal block cipher. Each of the three examples provided above emulate a random oracle provided h is ideal.

FIG. 1 is a schematic diagram of an example communication system 100. The communication system 100 includes a certificate authority server 104, two terminals 102, 106, and a data network 108. The communication system 100 can include additional, fewer, or different components. For example, the communication system 100 may include additional storage devices, additional servers (including additional certificate authority servers), additional terminals, and other features not shown in the figure.

The certificate authority server 104 and the terminals 102, 106 can communicate with each other and with other components of the communication system 100 over the data network 108. In the example shown in FIG. 1, the terminal can send a certificate request 120 to the certificate authority server 104, and the certificate authority server 104 can respond by sending an implicit certificate 122 to the terminal 102. The terminal 102 can send a signed message 124 to the terminal 106, and the terminal 106 can verify the authenticity of the signed message 124 using the implicit certificate 122. The communication system 100 can support additional or different types of communication. In some implementations, the terminals 102, 106 can also exchange encrypted messages and other types of information with each other, with the certificate authority server 104, and with other components of the communication system 100.

The example certificate authority server 104 is a computing device that can perform operations of a certificate authority in a cryptography system. The certificate authority server 104 generally includes one or more data processing apparatus, data storage media, and data communication interfaces. The certificate authority server 104 is generally operable to receive, transmit, process, and store information associated with the cryptography system. Although FIG. 1 shows a single certificate authority server 104, a certificate authority can be implemented using multiple certificate authority servers 104, including server clusters, as well as additional or different types of computing devices other than servers.

The certificate authority server 104 shown in FIG. 1 can be implemented as a computing system that includes one or more processors 112, memory 110, and one or more input/output controllers 114. The memory 110 can include, for example, random access memory (RAM), storage devices (e.g., a writable read-only memory (ROM), etc.), a hard disk, or other types of storage media. A computing system can be preprogrammed or it can be programmed (and reprogrammed) by loading a program from another source (e.g., from a DVD, from another computer device through a data network, or in another manner). The input/output controller 114 can be coupled to input/output devices (e.g., a monitor, a keyboard, etc.) and to the data network 108. The input/output devices receive and transmit data in analog or digital form over communication links such as a serial link, wireless link (e.g., infrared, radio frequency, etc.), parallel link, or another type of link.

The memory 110 can store instructions (e.g., computer code) associated with computer applications, programs and computer program modules, and other resources. For example, the memory 110 can store instructions associated with the computer program modules of a cryptography system. The memory 110 can also store application data and data objects that can be interpreted by applications, programs, modules, or virtual machines running on the computing system. For example, the memory 110 can store the data objects that are obtained or processed by the computing system. The memory 110 can store additional information, for example, files and instruction associated with an operating system, device drivers, archival data, or other types of information.

The processors 112 can execute instructions to generate output data based on data inputs. For example, the processors 112 can run applications and programs by executing or interpreting the software, scripts, functions, executables, and other types of computer program modules. In some instances, a processors may perform one or more of the operations shown in FIGS. 2, 3, 4 and 5. The input data received by the processor 112 and the output data generated by the processor 112 can be stored in a computer-readable medium, such as the memory 110 or a storage device.

The data network 108 can include any type of data communication network. For example, the data network 108 can include a wireless or wired network, a cellular network, a telecommunications network, an enterprise network, an application-specific public network, a Local Area Network (LAN), a Wide Area Network (WAN), a private network, a public network (such as the Internet), a WiFi network, a network that includes a satellite link, or another type of data communication network. The data network 108 can include a tiered structure defined by firewalls or similar features that implement various levels of security.

The example terminals 102, 106 are computing devices that can communicate over the data network 108 based on cryptographic communication schemes. The terminals 102, 106 each generally include one or more data processing apparatus, data storage media, and data communication interfaces. The terminals 102, 106 are generally operable to receive, transmit, process, and store information. Although FIG. 1 shows two terminals 102, 106, a communication system 100 may include any number of terminals. The communication system 100 can include groups or subgroups of terminals that can communicate with each other, but not necessarily with the terminals in other groups or subgroups. In some implementations, each group of terminals can access a dedicated certificate authority server and a database of implicit certificates that have been issued by the dedicated certificate authority server. The communication system 100 can include terminals of disparate types, having different types of hardware and software configurations, and in a variety of different locations. In some cases, multiple devices or subsystems can be identified together as a single terminal.

The example terminals 102, 106 shown in FIG. 1 can each be implemented as computing systems that include memory, one or more data processors, and one or more input/output controllers. A terminal can include user interface devices, for example, a monitor, touchscreen, mouse, or keyboard. The terminals 102, 106 can interface with the data network 108, for example, through a wired connection, a wireless connection, or any suitable combination. The memory of the terminal can store messages and information associated with the cryptography system. For example, a terminal may store public and private key data, digital certificate data, and other types of information. The memory of the terminal can store instructions (e.g., computer code) associated with computer applications, programs and computer program modules, and other resources. For example, the terminals can store instructions associated with the computer program modules of a cryptography system.

Terminals can include handheld devices such as smart phones, personal digital assistants (PDAs), portable media players, laptops, notebooks, tablets, and others. Terminals can include work stations, mainframes, non-portable computing systems, devices installed in structures, vehicles, and other types of installations. Terminals can include embedded communication devices. For example, the terminals can include messaging devices that are embedded in smart energy meters of a smart energy system. Other types of terminals may also be used.

In one aspect of operation, the terminal 102 sends the certificate request 120 to the certificate authority server 104, and the certificate authority server 104 generates the implicit certificate 122 for the terminal 102. The implicit certificate 122 associates a particular public key value with a particular entity (e.g., the terminal 102, a user associated with the terminal 102, a software module implemented at the terminal 102, or another type of entity). The terminal 102 receives the implicit certificate 122 from the certificate authority server 104. When the terminal 102 has a message to send to the terminal 106, the terminal 102 can generate a digital signature for the message based on the implicit certificate 122. The digital signature can be combined with the message to form the signed message 124, which the terminal 102 sends to the terminal 106. In some implementations, the digital signature and the message are sent separately. The terminal 106 receives the signed message 124, obtains the implicit certificate 122, and verifies the digital signature based on the implicit certificate 122. Implicit certificates can also be used in other types of schemes, for example, encryption schemes.

The implicit certificate 122 binds an entity (e.g., the terminal 102, a user associated with the terminal 102, a software module implemented at the terminal 102, or another type of entity) to a particular public key value that can be used to verify digital signatures generated by the terminal 102. The terminal 106 can obtain the implicit certificate 122 to verify that the digital signature was generated by the entity associated with the terminal 102, and not by an impostor. The terminal 106 can also verify that the implicit certificate 122 was generated by a trusted third party. In this manner, the implicit certificate 122 serves as confirmation by the trusted third party that the signed message 124 was signed by the entity associated with the terminal 102 and not by an impostor.

The example implicit certificate 122 includes an identification of the entity associated with the terminal 102. The example implicit certificate 122 also includes information that can be used to construct the entity's public key. In some cases, using the implicit certificate 122 to verify a digital signature also confirms that the entity is in possession of the corresponding private key. The example implicit certificate 122 shown in FIG. 1 includes neither an explicit representation of the public key nor an explicit representation of the certificate authority's digital signature. Thus, in some implementations, the implicit certificate 122 is more compact than some other types of digital certificates. In some cases, the implicit certificate 122 includes a digital signature of the certificate authority that allows entities, for example an entity associated with the terminal 106, to verify that the implicit certificate 122 was generated by the trusted certificate authority. The certificate authority can, in some cases, require the entity to prove knowledge of the entity's private key. In some cases, the implicit certificate 122 includes an explicit representation of the user's public key.

Instead of explicitly representing the public key of the terminal 102, the example implicit certificate 122 in FIG. 1 includes public key reconstruction data that can be combined with other information (e.g., the certificate authority's public key, etc.) to generate the public key of the entity associated with the terminal 102. The example implicit certificate 122 is constructed such that successful verification of a digital signature generated by the terminal 102 serves as confirmation that the terminal 102 is in possession of the private key. Thus, according to some implicit certificate schemes, binding of an entity to its public key and the entity's knowledge of its private key can be verified in unison during key usage.

Implicit certificate schemes can be implemented based on different types of groups. For example, the ECQV implicit certificate scheme, as well as others, may be implemented using a group of points on an elliptic curve, a multiplicative group of a finite field, or other groups where the discrete logarithm problem may be hard.

In some instances, the terminals 102, 106 can communicate according to a cryptographic scheme that does not involve a certificate authority or digital certificates. For example, the terminals 102, 106 may communicate based on a signature scheme, an encryption scheme, or another type of cryptographic scheme that does not use public keys. As another example, the terminals 102, 106 may communicate based on a signature scheme, an encryption scheme, or another type of cryptographic scheme that uses public keys that are not certified by a certificate authority. Moreover, in some cases, some or all operations of the certificate authority can be performed by one or both of the terminals 102, 106. In some instances, for example in a peer-to-peer computing environment, server functionality can be distributed among client devices.

Figure 2:
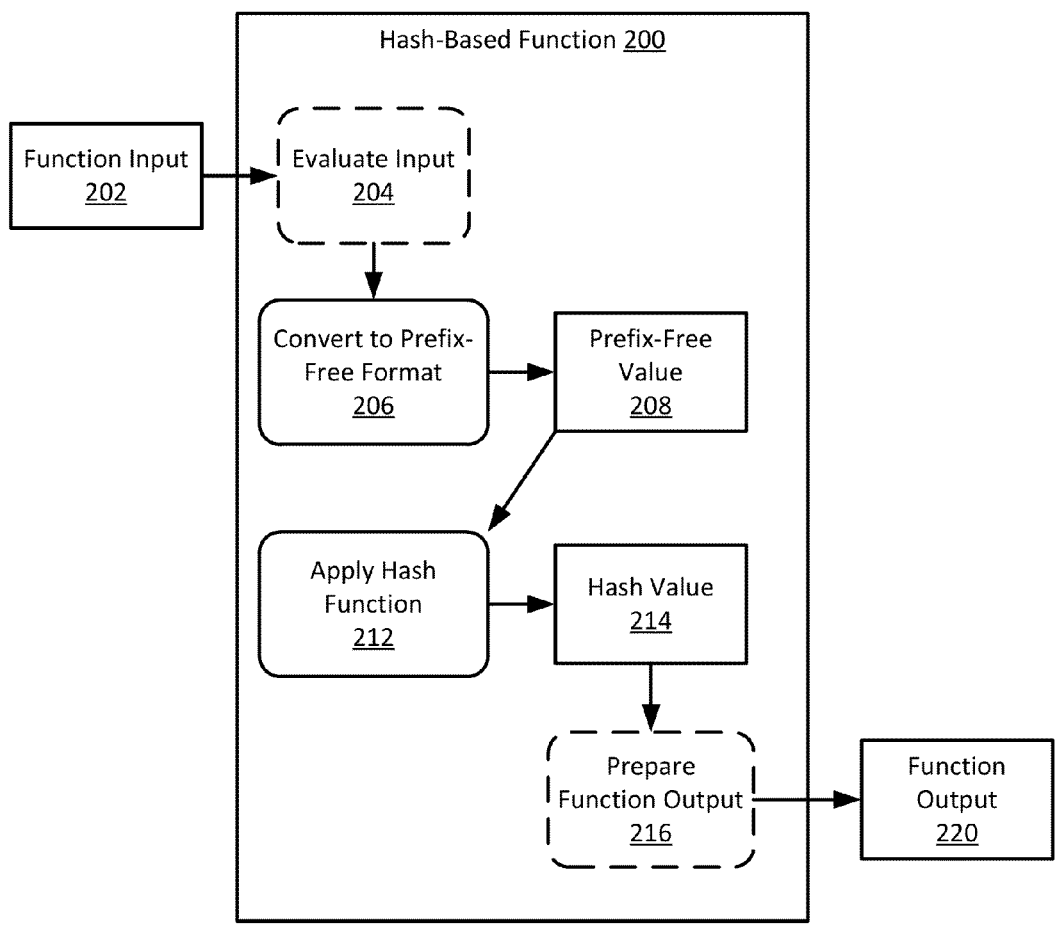
FIG. 2 is a schematic diagram of an example hash-based function.

FIG. 2 is a schematic diagram of an example hash-based function 200. The example hash-based function 200 shown in FIG. 2 can be implemented using additional, fewer, or different operations, which can be performed in the order shown or in a different order. In some implementations, one or more of the operations can be repeated or iterated, for example, until a terminating condition is reached. The hash-based function 200 can be implemented by an entity in the cryptography system, such as, for example, the certificate authority server 104 or the terminals 102, 106 shown in FIG. 1. The hash-based function 200 may be executed by a special-purpose processor, by a general-purpose processor, or by any suitable combination of these and other devices, as appropriate. In some instances, the hash-based function 200 is executed by a hash module. The hash module may include data processing apparatus (e.g., one or more a special-purpose processors, one or more a general-purpose processor, etc.), software, firmware, or any suitable combination of these and other resources that are configured to perform the operations shown in FIG. 2.

The hash-based function 200 can be applied to a variety of cryptographic schemes. In some cases, the hash-based function 200 can be used to implement a hash function in a signature scheme such as, for example, the Elliptic Curve Pintsov-Vanstone (ECPV) signatures schemes described in: the ANSI X9.62-2005 standard (*Public Key Cryptography for the Financial Services Industry: The Elliptic Curve Digital Signature Algorithm* (*ECDSA*)), the IEEE P1363a standard (*Standard Specifications for Public Key Cryptography: Pintsov-Vanstone Signatures with Message Recovery*); the ISO/IEC 9796-3:2006 standard (*Information technology—Security techniques—Digital signature schemes giving message recovery—Part 3: Discrete logarithm based mechanisms*); the SuiteE standard (*A Cryptographic Suite for Embedded Systems*); and possibly others. In some cases, the hash-based function 200 can be used to implement a hash function in a keyed ECPV signature scheme. Some example keyed ECPV signature schemes allow the signer to encrypt the recoverable part of the signed message in such a way that only the intended recipient may recover it; other parties may still verify the signature on the public part of the message. As another example, the hash-based function 200 can be used to implement a hash function in a digital signature scheme such as, for example, the elliptic curve Qu-Vanstone (ECQV) implicit certificate schemes described in: the SEC 4 standard (*Elliptic Curve Qu-Vanstone Implicit Certificate Scheme* (*ECQV*)), and the SuiteE standard.

In some instances, all entities in the cryptography system can access the hash-based function 200. For example, the entities may each have one or more data processing apparatus operable to implement the function. As such, in some example signature schemes, the signer and verifier both have access to the hash-based function 200; in some implicit certificate schemes, the requester, the relying party, and the certificate authority all have access to the hash-based function 200. An identification of the hash-based function 200 may be distributed to the entities, for example, in the domain parameters of the cryptographic scheme, or the entities may agree in advance to use the function 200 in another manner.

At a high level, the example hash-based function 200 receives a function input 202 and produces a function output 220. The function input 202 can include a single input or it can include multiple inputs. The function input 202 can be formatted as any suitable data format (e.g., binary, numeric, text, etc., as appropriate). The function output 220 can include a single output or it can include multiple outputs. The function output 220 can be formatted according to any suitable data format (e.g., binary, numeric, text, etc., as appropriate). In some implementations, the hash-based function can be expressed F: $\{0, 1\}^* \rightarrow \{0, 1\}^l$, as a function that maps variable-length bit strings to fixed-length bit strings of length l. In some implementations, the function output 220 is a binary value of length κ, where κ represents the security parameter of a cryptography system.

In some implementations, the hash-based function 200 is indistinguishable from a truly random function. For example, from an adversary's perspective the hash-based function 200 may emulate a random oracle. In some implementations, the hash-based function 200 does not have the MD structure and can be used as a countermeasure against (e.g., to reduce exposure to) a herding attack or another type of attack. In some implementations, the hash-based function 200 is rpp-resistant, rpsp-resistant, or both. The hash-based function 200 may also be collision-resistant in some instances.

The function input 202 can include any suitable data, data objects, files, variables, or other information. The function input 202 may include, for example, an integer, an elliptic curve point, alphanumeric information, an identifier, or any other suitable type of information. The function input 202 can represent any suitable information. The function input 202 may represent, for example, key data (e.g., public key, private key, symmetric key, short-term key, long-term key, etc.), certificate data (e.g., implicit certificate data, explicit certificate data, etc.), encoded message data, plaintext message data, signature data, etc.

In some example digital certificate schemes, the function input 202 includes a digital certificate. For example, the function input 202 can be the implicit certificate Cert$_U$ of the ECQV scheme represented in FIG. 3. The function input 202 may represent additional or different information in a digital certificate scheme, as appropriate. In some example digital signature schemes, the function input 202 includes message data. For example, the function input 202 can be C∥V, the encoded message part C concatenated with the second message part V in the example ECPV signature scheme represented in FIG. 4. As another example, the function input 202 can be $C_1 \| C_2 \| V$, the first encoded message part $C_1$ concatenated with the second encoded message part $C_2$ concatenated with the third message part V in the example keyed ECPV signature scheme represented in FIG. 5. The function input 202 may represent additional or different information in a digital signature scheme, as appropriate.

At 204, the function input 202 is evaluated. Generally, evaluating the function input 202 prepares the function input to be converted to a prefix-free format. In some instances, evaluating the function input 202 includes identifying a size, format, or a combination of these and other properties of the function input 202. In some instances, the function input 202 can be directly converted to a prefix-free format, and no data manipulation or arithmetic is required to evaluate the function input 202.

In some implementations, evaluating the function input 202 includes parsing the function input 202 into multiple blocks of equal length. For example, when the hash function (to be applied at 212) includes an encryption function (e.g., AES in counter or cipher block chaining mode, etc.) or another type of operation that operates on blocks of data, the function input 202 can be parsed into blocks of the appropriate length.

At 206, the function input 202 is converted to a prefix-free format. Any suitable prefix-free format may be used. In some implementations, converting the function input 202 to a prefix-free format maps the function input 202 to one particular value in set of prefix-free values. A set of strings Σ can be considered prefix-free when, for all distinct x, y ∈Σ, x is not a prefix of y. Converting the function input 202 to a prefix-free format may include applying one or more conversion functions, one or more prepending or appending operations, one or more formatting functions, or any suitable combination of these and other types of operations. In some examples, prepending a first value to a second value joins the first value (e.g., as a prefix) at the beginning of the second value; and appending a first value to a second value joins the first value (e.g., as a suffix) at the end of the second value.

In some implementations, the function input 202 is converted to a prefix-free format by prepending to the function input 202 a value indicating the length of the function input 202. For example, the input string 'ab' can be converted to '2ab', the input string 'abc' can be converted to '3abc', etc. Any suitable unit of length may be used. Accordingly, converting the function input 202 to a prefix-free value can include generating a first value that indicates a length of the function input 202, and producing the prefix-free value 208 by prepending the first value to the function input 202. The first value may indicate the length of the function input 202 in units of blocks, bytes, bits, or any other unit that is appropriate for the given context.

In some implementations, converting the function input 202 to a prefix-free format includes appending a first bit (either a "1" or a "0") or another specified value to each block of the function input 202 except the last block, and appending a different bit (the opposite of the first bit) or a different specified value to the last block of the function input 202. For example, a zero bit ("0") may be appended to all of the blocks except the last block, and a one bit ("1") may be appended to the last block. Additional or different values may be used.

In some implementations, converting the function input 202 to a prefix-free value includes converting the function input 202 to a predetermined length. In other words, the converting operation applied at 206 may be configured to produce an output of a particular length (e.g., $2^7$, $2^8$, $2^9$, $2^{10}$, etc.) for variable length inputs. For example, a padding or truncating operation can be applied to produce a prefix-free value 208 having the predetermined length. Accordingly, converting the function input 202 to a prefix-free value may include comparing the length of the function input 202 with a predetermined output length, and either truncating or augmenting the function input 202 depending on the result of the comparison. Truncating the function input 202 may be accomplished, for example, by removing the appropriate number of characters or bits. Augmenting the function input 202 may be accomplished, for example, by appending or prepending the appropriate number of characters or bits. The appropriate number of characters or bits can be determined, for example, based on the difference between the length of the function input 202 and the predetermined output length.

In the example shown in FIG. 2, converting the function input 202 to the prefix-free format produces a prefix-free value 208. Additional or different operations (e.g., data formatting, etc.) may be applied to convert the function input 202 to an appropriate input value for the hash function.

At 212, a hash function is applied to the prefix-free value 208. The hash function can be any suitable hash function. In some instances, the hash function can be represented as H: $\{0, 1\}^* \rightarrow \{0, 1\}^l$. In some instances, l=κ, where κ represents the security parameter of a cryptographic scheme. The hash function may produce an output of any suitable length, including 128 bits or another length. The hash function can have the Merkle-Damgård (MD) structure. For example the hash function H: $\{0, 1\}^* \to \{0, 1\}^l$ can be formed from a compression function h: $\{0, 1\}^\mu \to \{0, 1\}^l$, for some fixed $\mu > 1$. A hash function may take other forms or have different properties. In some implementations, the hash function can be an AES-MMO hash function, a SHA-family hash function, MD5, or a different hash function, as appropriate.

Applying the hash function to the prefix-free value produces the hash value 214. At 216, the function output 220 is prepared based on the hash value 214. The function output 220 can be prepared based on additional or different data. Preparing the function output 220 generally includes generating an output of the appropriate size and format. In some instances, the hash value 214 is directly provided as the function output 220, and no manipulation or arithmetic is required to prepare the function output 220. In some instances, the hash value 214 is converted to an integer or another data format at 216.

The function output 220 can include any suitable data, data objects, files, variables, or other information. In some examples, the function output 220 is a fixed-length binary value. The function output 220 can be used for any suitable purpose, for example, in cryptographic operations. In some instances, the function output 220 may be combined with key data (e.g., public key, private key, symmetric key, short-term key, long-term key, etc.), certificate data (e.g., implicit certificate data, explicit certificate data, etc.), encoded message data, plaintext message data, signature data, etc. As another example, the function output 220 may be transmitted to, or included in a message transmitted to, a correspondent in a cryptography system.

In some example digital certificate schemes, the function output 220 is combined with one or more values to produce a private key reconstruction value. For example, the function output 220 can be the hash value e in the ECQV scheme represented in FIG. 3. A certificate authority may combine the function output 220 with a private value k and a certificate authority's private key $d_{CA}$ to produce the private key contribution value $r = ek + d_{CA}$ (mod n). A certificate requester or a correspondent may combine the function output 220 with a public key reconstruction value $P_U$ and a certificate authority's public key $Q_{CA}$ to produce the requester's public key $Q_U = eP_U + Q_{CA}$. A certificate requester may combine the function output 220 with a private value $k_U$ and a private key contribution value r to produce the requester's private key $d_U = ek_U + r$ (mod n). The function output 220 can be used in other ways and for additional or different purposes in a digital certificate scheme, as appropriate.

In some example digital signature schemes, the function output 220 is combined with one or more values to produce a digital signature component. For example, the function output 220 can be the hash value e in the ECPV scheme represented in FIG. 4 or in the keyed ECPV scheme represented in FIG. 5. A signer may combine the function output 220 with the integer z and the signer's longer term private key $d_A$ to produce the signature component $s = z - d_A e$ (mod n). A verifier may combine the function output 220 with the signer's long-term public key $G_A$, the base-point generator G, and the signature component s to produce the elliptic curve point $Q' = sG + eG_A$. The function output 220 can be used in other ways and for additional or different purposes in a digital signature scheme, as appropriate.

Figure 3:
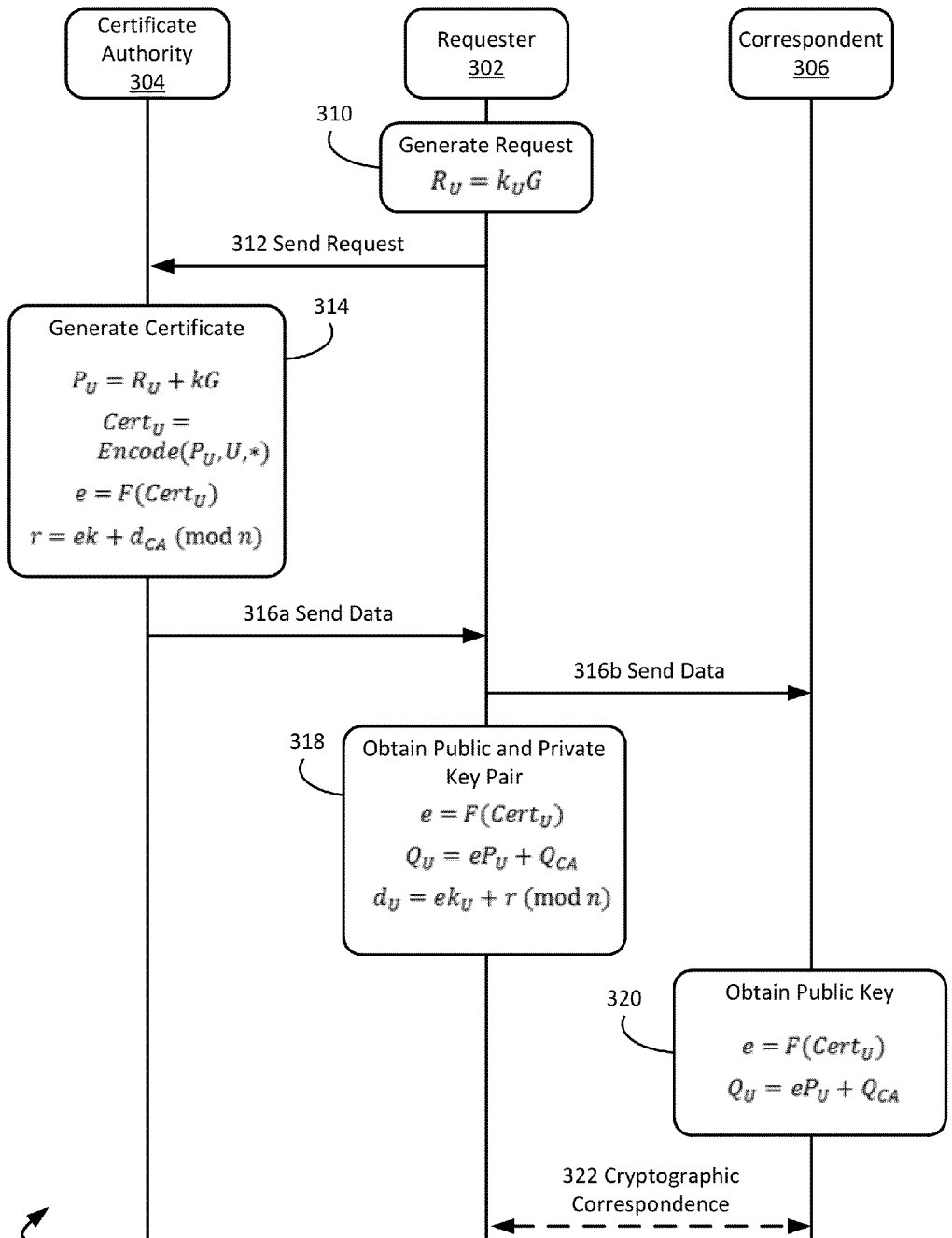
FIG. 3 is a signaling and flow diagram showing operations in an example implicit certificate scheme.
Figure 4:
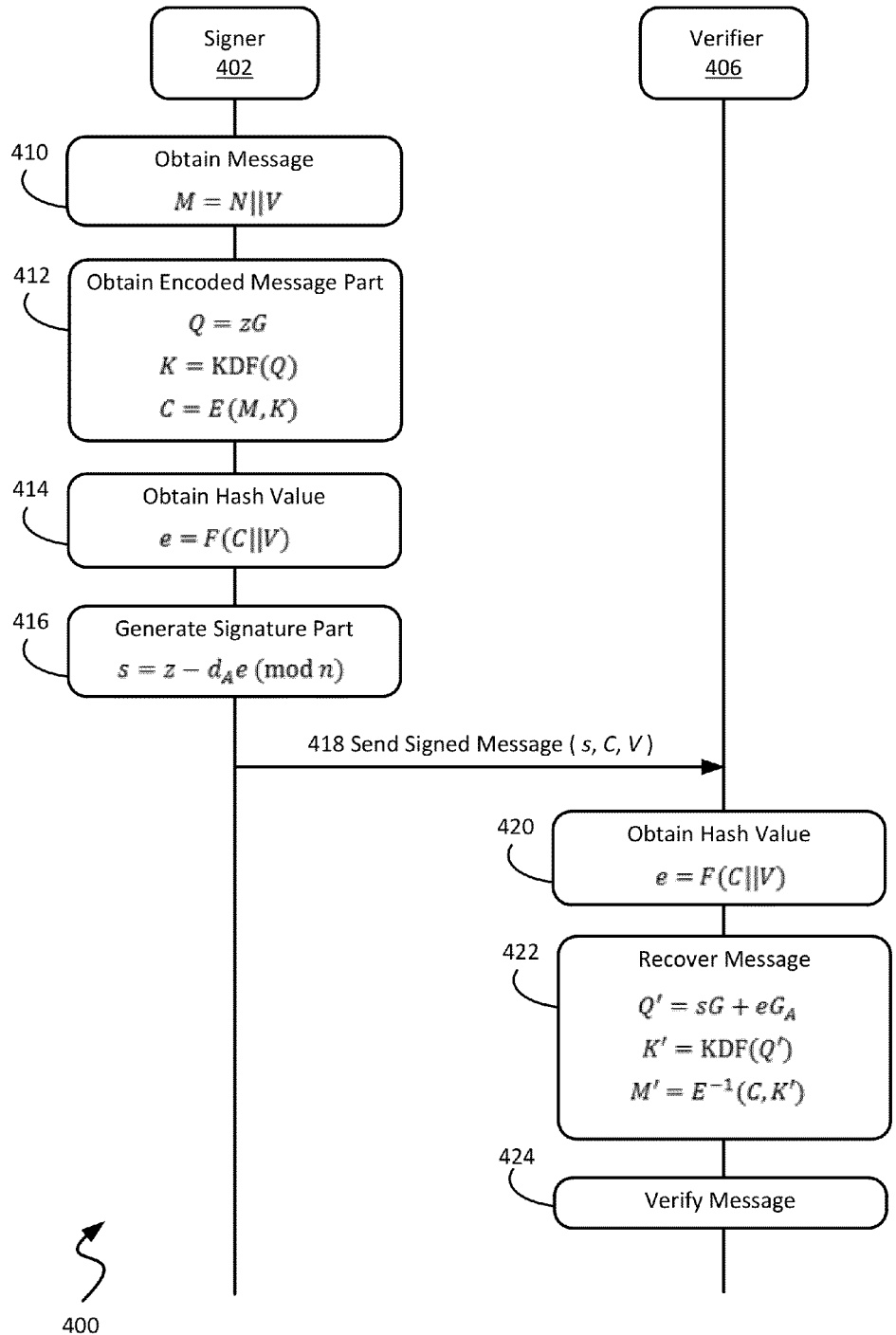
FIG. 4 is a signaling and flow diagram showing operations in an example digital signature scheme.
Figure 5:
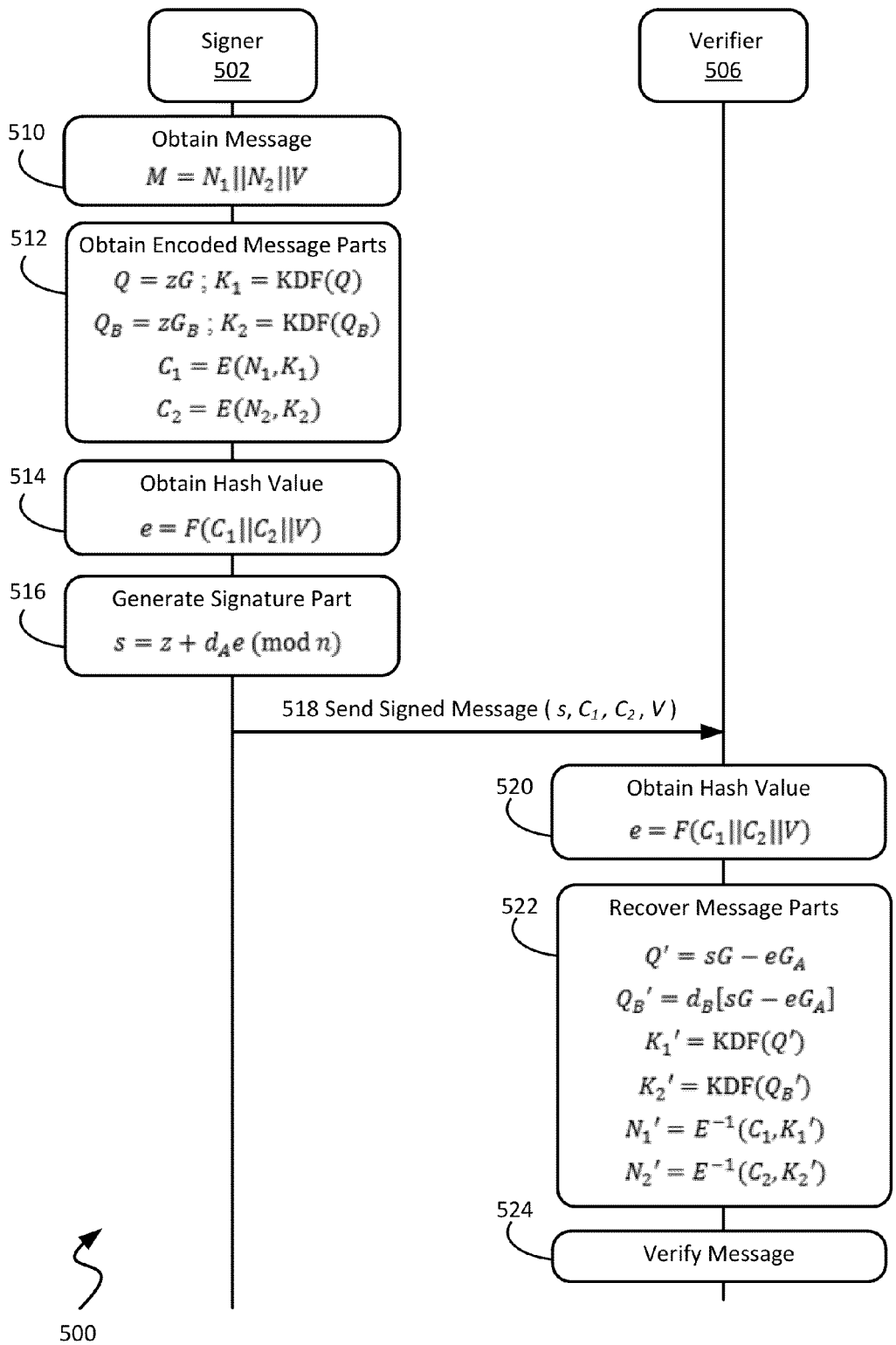
FIG. 5 is a signaling and flow diagram showing operations in another example digital signature scheme.

FIGS. 3, 4, and 5 show examples of cryptographic schemes where the hash-based function 200 may be used. For example, in some instances, the function F shown in FIGS. 3, 4, and 5 can be implemented using the hash-based function 200 shown in FIG. 2. The hash-based function 200 can also be used in other contexts and for other purposes.

The examples shown in FIGS. 3, 4, and 5 are ECC-based cryptographic schemes. In particular, FIG. 3 shows example operations in an elliptic curve Qu-Vanstone (ECQV) implicit certificate scheme; FIG. 4 shows example operations in an elliptic curve Pintsov-Vanstone (ECPV) signature scheme; and FIG. 5 shows example operations in a keyed variant of the ECPV signature scheme. The hash-based function 200 can be used in these example ECC-based cryptographic schemes as well as other types of ECC-based cryptographic schemes. In some implementations, the hash-based function 200 may also be used in other suitable types of cryptographic schemes.

In an ECC-based cryptographic scheme, information is encoded in elliptic curve points of an elliptic curve group. An elliptic curve group can be described in terms of a solution to an equation over a finite field, for example, a prime finite field or a characteristic-two finite field. Each point in the elliptic curve group is a pair of field elements corresponding to a solution to an elliptic curve equation. The elliptic curve group also includes an identity element. As a particular example, let $\mathbb{F}_p$ represent a prime finite field where p is an odd prime number, and let a, $b \in \mathbb{F}_p$ satisfy $4.a^3 + 27.b^2 \neq 0$ (mod p). The elliptic curve group $E(\mathbb{F}_p)$ over $\mathbb{F}_p$, which is defined by the parameters a, $b \in \mathbb{F}_p$, includes the set of points $P = (x, y)$ for x, $y \in \mathbb{F}_p$ that represent a solution to the equation $y^2 \equiv a.x + b$ (mod p), together with a point at infinity $\mathcal{O}$ that is the identity element of the elliptic curve group $E(\mathbb{F}_p)$.

In an ECC-based scheme, elliptic curve domain parameters over $\mathbb{F}_p$ can be identified by a sextuple $T = (p, a, b, G, n, h)$. The integer p specifies the finite field $\mathbb{F}_p$. Field elements a, b $\in \mathbb{F}_p$ specify an elliptic curve $E(\mathbb{F}_p)$ over $\mathbb{F}_p$ as discussed above. The elliptic curve point $G = (x_G, y_G)$ on $E(\mathbb{F}_p)$ is a base point generator. The integer n specifies the order of the base point generator G, having the property $nG = \mathcal{O}$. The cofactor h is equal to $\#E(\mathbb{F}_p)/n$, which is the number of points on the elliptic curve $E(\mathbb{F}_p)$ divided by the order of the base point generator G. Elliptic curve domain parameters may alternatively be identified over other types of finite fields. For example, elliptic curve domain parameters over the characteristic two field $\mathbb{F}_{2^m}$ can be identified by a septuple $T = (m, f(x), a, b, G, n, h)$, where m is an integer specifying the finite field $\mathbb{F}_{2^m}$ and $f(x)$ is an irreducible binary polynomial of degree m specifying the representation of $\mathbb{F}_{2^m}$. In some implementations, the elliptic curve domain parameters can be generated, validated, and utilized by a terminal associated with an entity or by a certificate authority.

In an ECC-based scheme, an elliptic curve key pair (d, Q) can be generated based on valid elliptic curve domain parameters, for example, $T = (p, a, b, G, n, h)$ or $T = (m, f(x), a, b, G, n, h)$. The key pair may be generated by selecting a random integer d in the interval [1, n−1], computing $Q = dG$, and outputting the key pair (d, Q). The random integer d may be selected or obtained by a random number generator. In some implementations, elliptic curve key pairs can be generated, validated, and processed by a terminal associated with an entity or by a certificate authority.

Elliptic curve key pairs can be validated using multiple different types of techniques. Validating an elliptic curve key pair provides assurance that the public key satisfies the arithmetic requirements of the cryptography system, for example, to prevent malicious insertion of an invalid public key to enable attacks or to detect inadvertent coding or transmission errors. For example, a public key can be validated by checking that $Q \neq \mathcal{O}$, checking that $nQ \neq \mathcal{O}$, and checking that the public key Q satisfies the elliptic curve equation specified by the elliptic curve domain parameters T=(p, a, b, G, n, h) or T=(m, f(x), a, b, G, n, h), for example, based on the coordinates $(x_Q, y_Q)$ of the elliptic curve point specified by the public key Q.

FIG. 3 is a signaling and flow diagram showing operations in an example implicit certificate scheme 300. The example implicit certificate scheme 300 includes operations performed by a requester 302, a certificate authority 304, and a correspondent 306. The requester 302 and the correspondent 306 can be, or they can be associated with, entities in a cryptography system. For example, the requester 302 can be the terminal 102 in FIG. 1, and the correspondent 306 can be the terminal 106 in FIG. 1. Similarly, the certificate authority 304 can be, or it can be associated with a certificate authority entity. For example, the certificate authority 304 can be the certificate authority server 104 in FIG. 1. The entities represented in FIG. 3 can be implemented by additional or different types of hardware, software, systems, devices, or combinations of these, as appropriate.

At a high level, the requester 302 sends a request to the certificate authority 304 and receives an implicit certificate in response. The implicit certificate allows the correspondent 306 to reconstruct a certified public key of the requester 302. In an example shown, the certificate authority 304 can obtain the certificate authority's key pair $(d_{CA}, Q_{CA})$, and the requester 302 and the correspondent 306 can receive authentic copies of the certificate authority's public key and domain parameters.

The example operations and communications shown in FIG. 3 are described with respect to the ECQV implicit certificate scheme. The operations and communications shown in FIG. 3 can be adapted or modified for additional or different types of implicit certificate schemes. In the example shown in FIG. 3, the requester 302, the certificate authority 304, and the correspondent 306 are each in possession of elliptic curve domain parameters (e.g., T=(p, a, b, G, n, h)) and a random number generator, and they have agreed on a function F that produces a hash value, a certificate encoding scheme, valid data types, and other parameters necessary to carry out the operations shown. In addition, in some implementations the requester 302 has been assigned a unique identifier U.

At 310, the requester 302 generates a certificate request. For example, the requester 302 can generate the request by selecting a value $k_U \in_R [1, n-1]$ and computing $R_U = k_U G$. At 312, certificate request data are sent from the requester 302 to the certificate authority 304. For example, the certificate request data can include the requester's identifier U and the elliptic curve point $R_U$ in the appropriate data formats. The data may be transmitted in any suitable manner, using any suitable hardware. In some implementations, the request data are transmitted over a data network, over one or more wired or wireless links, etc. When the certificate authority 304 receives the request, the certificate authority 304 can verify the identity of the requester 302, perform validity checks, and determine that an implicit certificate will be issued.

At 314, the certificate authority 304 generates an implicit certificate. The certificate authority 304 encodes the public key reconstruction data for the requester 302 in the implicit certificate. The public key reconstruction data can include elliptic curve point $P_U$. The elliptic curve point $P_U$ can be generated, for example, by computing $P_U = R_U + kG$. Here, $k \in_R [1, n-1]$ represents an integer, and G represents the base point generator specified in the domain parameters. In some implementations, k is a random number in the interval $[1, n-1]$ generated using the random number generator at the certificate authority. Additional or different techniques can be used to generate the public key reconstruction data.

In the example shown in FIG. 3, the certificate authority 304 generates the implicit certificate $\text{Cert}_U$ by calling a certificate encoding routine $\text{Cert}_U = \text{Encode}(P_U, U, *)$, generates the hash value e by computing $e = F(\text{Cert}_U)$, and generates the private key contribution data $r = ek + d_{CA}$ mod n. The implicit certificate data can be encoded in $\text{Cert}_U$ using any suitable encoding scheme. For example, a fixed-length field scheme, a minimal ANS.1 encoding scheme, an X.509-compliant ANS.1 encoding scheme, or another suitable scheme can be used.

In the example shown in FIG. 3, the certificate authority 304 obtains the hash value e by evaluating a function $F(\text{Cert}_U)$. The hash value e can be generated using any appropriate hash function or hash-based function F, and the function F can be evaluated based on additional or different input, as appropriate. In some implementations, the function F is the hash-based function 200 shown in FIG. 2.

In some implementations, after generating the implicit certificate and the private key contribution data, the certificate authority 304 generates the requester's public key $Q_U$. The certificate authority 304 may generate the requester's public key, for example, by computing $Q_U = eP_U + Q_{CA}$. Here, $Q_{CA} = d_{CA}G$ is the certificate authority's public key that corresponds to the certificate authority's private key $d_{CA}$. The certificate authority 304 may generate the requester's public key $Q_U$, for example, to verify that the public key $Q_U$ corresponds to a point on the elliptic curve specified by the domain parameters, to verify that the public key $Q_U$ is not the point at infinity $\mathcal{O}$, to verify that the public key $Q_U$ has not already been assigned to another entity, or for another suitable purpose.

At 316a, certificate data are sent from the certificate authority 304 to the requester 302. For example, the certificate data can include the values r and $\text{Cert}_U$ in the appropriate data formats. The requester 302 receives the certificate data from the certificate authority 304. At 316b, implicit certificate is sent from to the correspondent 306. For example, the $\text{Cert}_U$ and additional information may be sent to the correspondent 306 in the appropriate data formats. The correspondent 306 may receive the implicit certificate from the certificate authority 304, the requester 302, or another source. The data may be transmitted in any suitable manner, using any suitable hardware. In some implementations, the certificate data are transmitted over a data network, over one or more wired or wireless links, etc.

At 318, the requester 302 uses the certificate data to generate the requester's elliptic curve key pair $(d_U, Q_U)$. The requester 302 can generate the elliptic curve key pair $(d_U, Q_U)$ by computing the hash value $e = F(\text{Cert}_U)$, computing the private key value $d_U = ek_U + r$ (mod n), and computing the public key value $Q_U = eP_U + Q_{CA}$. Here, the requester 302 generates the hash value e using the same function F that the certificate authority 304 used to generate the hash value e when generating the certificate data at 314.

The requester 302 may use the hash value e to generate the requester's public key $Q_U$ or the requester's private key $d_U$ or both for any suitable purpose. For example, the requester 302 may verify that the public key $Q_U$ corresponds to a point on the elliptic curve specified by the domain parameters, to verify that the public key $Q_U$ is not the point at infinity $\mathcal{O}$ or to perform other verifications. As another example, the requester may verify that the private key $d_U$ corresponds to an integer in the appropriate range (which may be specified by the domain parameters), to verify that the private key $d_U$ is not zero, or perform other verifications. In some instances, the requester 302 may use the private key $d_U$ to generate a digital signature, to encrypt a message, or for another type of cryptographic operation. The requester 302 may explicitly compute the requester's private key $d_U$ or the requester's public key $Q_U$ or both, or the requester 302 may incorporate the equation for the public key $Q_U=eP_U+Q_{CA}$ or the equation for the private key $d_U=ek_U+r$ (mod n) or both into another cryptographic operation, as appropriate. As such, the requester 302 may use the requester's private key $d_U$ or the requester's public key $Q_U$ or both without explicitly computing them.

At 320, the correspondent 306 uses the implicit certificate to generate the requester's public key $Q_U$. The correspondent 306 can generate the requester's public key by computing the hash value $e=F(Cert_U)$ and computing the public key value $Q_U=eP_U+Q_{CA}$. Here, the correspondent 306 generates the hash value e using the same function F that the certificate authority 304 used to generate the hash value e when generating the certificate data at 314.

The correspondent 306 may use the hash value e to generate the requester's public key $Q_U$ for any suitable purpose. For example, the correspondent 306 may verify that the public key $Q_U$ corresponds to a point on the elliptic curve specified by the domain parameters, to verify that the public key $Q_U$ is not the point at infinity $\mathcal{O}$, or to perform other verifications. In some instances, the correspondent 306 may use the public key $Q_U$ to verify a digital signature, to decrypt a message, or for another type of cryptographic operation. The correspondent 306 may explicitly compute the pubic key $Q_U$, or the correspondent 306 may incorporate the equation for the public key $Q_U=eP_U+Q_{CA}$ into another cryptographic operation, as appropriate. As such, the correspondent 306 may use the requester's public key $Q_U$ or both without explicitly computing it.

At 322, the requester 302 and the correspondent 306 can carry out cryptographic correspondence. For example, the cryptographic correspondence may involve data encryption, data authentication, or a combination of these and other operations. The cryptographic correspondence may be based on the requester's elliptic curve key pair $(d_U, Q_U)$ and possibly additional key data. For example, the correspondent 306 may encrypt a message using the requester's public key $Q_U$, and the requester 302 may decrypt the encrypted message using the requester's private key $d_U$. As another example, the requester 302 may sign a message based on the requester's private key $d_U$, and the correspondent 306 may authenticate the signed message using the requester's public key $Q_U$.

FIG. 4 is a signaling and flow diagram showing operations in an example digital signature scheme 400. The example digital signature scheme 400 includes operations performed by a signer 402 and a verifier 406. The signer 402 and the verifier 406 can be, or they can be associated with, entities in a cryptography system. For example, the signer 402 can be the terminal 102 in FIG. 1, and the verifier 406 can be the terminal 106 in FIG. 1. The entities represented in FIG. 4 can be implemented by additional or different types of hardware, software, systems, devices, or combinations of these, as appropriate.

At a high level, the signer 402 generates a signature on a message and sends a signed version of the message to the verifier 406. The signature allows the verifier 406 to recover the message and verify its authenticity. The example operations and communications shown in FIG. 4 are described with respect to the ECPV signature scheme. The operations and communications shown in FIG. 4 can be adapted or modified for additional or different types of signature schemes. In the example shown in FIG. 4, the signer 402 and the verifier 406 are each in possession of elliptic curve domain parameters (e.g., T=(p, a, b, G, n, h)) and a random number generator, and they have agreed on a function F that produces a hash value, an encoding function E, a key derivation function (KDF), valid data types, and other parameters necessary to carry out the operations shown. In some implementations, the encoding function E is a symmetric encryption function, and the decoding function $E^{-1}$ is the corresponding decryption function. The key derivation function can be any suitable function that produces a key appropriate for use in the encoding function E. Some example key derivation functions are provided in NIST SP 800-108 (*National Institute of Standards and Technology, Special Publication* 800-108).

In an example shown in FIG. 4, the signer 402 has a long-term key pair $(d_A, G_A)$ that includes the signer's long-term private key $d_A$ and the signer's long-term public key $G_A=d_AG$. The signer 402 may obtain the long-term key pair $(d_A, G_A)$ based on interactions with a certificate authority, or the signer 402 may generate the long-term key pair $(d_A, G_A)$ independent of a certificate authority. The verifier 406 may receive the signer's long-term public key $G_A$ from the signer 402 or from another source. The verifier 406 may obtain the signer's long-term public key $G_A$ from a digital certificate such as, for example, an implicit certificate issued by a certificate authority. In some implementations, there is no digital certificate associated with the signer's long-term public key $G_A$.

At 410, the signer 402 obtains a message M. The message may be, or may include, any suitable data or information to be communicated to the verifier 406. For example, the message can include any suitable type of electronic document, data file, data object, or other form of information. In some cases, the message is an e-mail message, an electronic document, or an electronic data file that can be edited and rendered by appropriate software applications. In some cases, the message is a data message or a combination of data messages used in signaling applications among hardware components.

In the example shown in FIG. 4, the message M=N||V includes two message parts: a first message part N and a second message part V. In some instances, the signer 402 identifies the two message parts, for example, based on the size of the message, based on the content of the message, based on a parsing algorithm, or based on a combination of these and any other suitable criteria. In some instances, the message includes a different number of message parts.

At 412, the signer 402 obtains an encoded message part C. In the example shown in FIG. 4, the signer 402 obtains the encoded message part C by computing an elliptic curve point Q=zG, deriving a key K=KDF(Q) based on a key derivation function (KDF), and computing the encoded message part C=E(M, K) based on an encoding function E. The integer z and the corresponding elliptic curve point Q can be considered a short-term (or "ephemeral") key pair (z, Q). The signer's short-term key pair (z, Q) may be obtained by any suitable technique. In some implementations, z is a random number in the interval [1, n−1] generated using a random number generator at the signer 402, and the corresponding elliptic curve point Q is generated by combining the integer z with the base point generator G. The key K can be derived from the elliptic curve point Q using any suitable key derivation function. For example, the key K can be derived by applying a key derivation function to a bit string derived from an x-coordinate of the point Q, or the key K can be derived by any other suitable technique. The encoded message part C can be computed from the message M and the key K using any suitable encoding function. For example, the encoding function can be, or it can include, an encryption function or another type of encoding function.

At 414, the signer 402 obtains a hash value e. In the example shown in FIG. 4, the signer 402 obtains the hash value e by evaluating a function $F(C\|V)$ based on the encoded message part C concatenated with the second message part V. The hash value e can be generated using any appropriate hash function or hash-based function F, and the function F can be evaluated based on additional or different inputs, as appropriate. In some implementations, the function F is the hash-based function 200 shown in FIG. 2.

At 416, the signer 402 generates a signature part s. In the example shown in FIG. 4, the signer 402 obtains the signature part s by computing $s=z-d_A e \pmod{n}$. (This equation can be modified, provided that there is a corresponding change to the operations performed by the verifier. As an example, the signature part s can be obtained at 416 by computing $s=z+d_A e \pmod{n}$, and the operations performed by the verifier (e.g., to recover the message parts at 422) can be modified accordingly. Additional or different modifications may be made, as appropriate.) Here, z is the integer that the signer 402 used at 412 to produce the elliptic curve point Q, $d_A$ is the signer's private key value, e is the hash value, and n is an integer representing the order of the base point generator G. The signature part s may be generated by any suitable technique.

At 418, the signer 402 sends the signed message to the verifier 406. In the example shown in FIG. 4, sending the signed message to the verifier 406 includes sending the signature part s, the encoded message part C, and the second message part V to the verifier 406. The data may be transmitted in any suitable manner, using any suitable hardware. In some implementations, the signed message is transmitted over a data network, over one or more wired or wireless links, etc. The signature part s, the encoded message part C, and the second message part V may be sent together or they may be sent separately, or they may be sent in any suitable combination. The data may be converted to an appropriate data format for transmission to the verifier 406. The verifier 406 receives the signed message from the signer 402.

At 420, the verifier 406 obtains the hash value e. In the example shown in FIG. 4, the verifier 406 generates the hash value e using the same function $F(C\|V)$ that the signer 402 used to generate the hash value e, which was used in generating the signature part s at 416. The verifier 406 obtains the hash value e based on the encoded message part C and the second message part V, which were both received from the signer 402. The verifier 406 may obtain the hash value e based on additional or different information, as appropriate.

At 422, the verifier 406 recovers a message M'. In the example shown in FIG. 4, the message M' is recovered by computing an elliptic curve point $Q'=sG+eG_A$, deriving a key $K'=KDF(Q')$ based on the key derivation function KDF, and computing the message $M'=E^{-1}(C, K')$ based on the decoding function $E^{-1}$. The key K' is derived by evaluating the key derivation function KDF on the elliptic curve point Q', and the message M' is computed by using the key K' to evaluate the decoding function $E^{-1}$ on the encoded message part C. Here, the verifier 406 uses the same key derivation function KDF that the signer 402 used to derive the key K; and the decoding function $E^{-1}$ used by the verifier 406 is the inverse of the encoding function E that was used by the signer 402 to calculate the encoded message part C. For example, if the signer 402 uses an encryption function to produce the encoded message part C, then the verifier 406 uses a corresponding decryption function to produce the message M'.

At 424, the verifier 406 verifies the recovered message M'. Verifying the recovered message M' may indicate that the digital signature is authentic. The recovered message M' can be verified by any suitable technique. In some implementations, if the decoding operation $E^{-1}$ returns an error message or an invalid value, then the recovered message M' is not verified, and the digital signature may be considered inauthentic. In some implementations, if the decoding operation $E^{-1}$ returns value that is valid or is not an error message, then the recovered message M' is verified, and the digital signature may be considered authentic. In some implementations, if the digital signature is authentic, then Q'=Q, K'=K, and M'=M, and therefore the recovered message M' matches the sender's initial message $M=N\|V$.

FIG. 5 is a signaling and flow diagram showing operations in another example digital signature scheme 500. The example digital signature scheme 500 includes operations performed by a signer 502 and a verifier 506. The signer 502 and the verifier 506 can be, or they can be associated with, entities in a cryptography system. For example, the signer 502 can be the terminal 102 in FIG. 1, and the verifier 506 can be the terminal 106 in FIG. 1. The entities represented in FIG. 5 can be implemented by additional or different types of hardware, software, systems, devices, or combinations of these, as appropriate.

At a high level, the signer 502 generates a signature on a message and sends a signed version of the message to the verifier 506. The signature allows the verifier 406 to recover the message and verify its authenticity. The signature may also include an encrypted portion that provides confidentiality for at least a portion of the message. The example operations and communications shown in FIG. 5 are described with respect to the keyed variant of the ECPV signature scheme. The operations and communications shown in FIG. 5 can be adapted or modified for additional or different types of signature schemes. In the example shown in FIG. 5, the signer 502 and the verifier 506 are each in possession of elliptic curve domain parameters (e.g., T=(p, a, b, G, n, h)) and a random number generator, and they have agreed on a function F that produces a hash value, an encoding function E, a key derivation function (KDF), valid data types, and other parameters necessary to carry out the operations shown. In some implementations, the encoding function E is a symmetric encryption function, and the decoding function $E^{-1}$ is the corresponding decryption function. The key derivation function can be any suitable function that produces a key appropriate for use in the encoding function E.

In an example shown in FIG. 5, the signer 502 has a long-term key pair $(d_A, G_A)$ that includes the signer's long-term private key $d_A$ and the signer's long-term public key $G_A=d_A G$. The signer 502 may obtain the long-term key pair $(d_A, G_A)$ based on interactions with a certificate authority, or the signer 502 may generate the long-term key pair $(d_A, G_A)$ independent of a certificate authority. The verifier 506 may receive the signer's long-term public key $G_A$ from the signer 502 or from another source. The verifier 506 may obtain the signer's long-term public key $G_A$ from a digital certificate such as, for example, an implicit certificate issued by a certificate authority. In some implementations, there is no digital certificate associated with the signer's long-term public key $G_A$.

In an example shown in FIG. 5, the verifier 506 has a long-term key pair $(d_B, G_B)$ that includes the verifier's long-term private key $d_B$ and the verifier's long-term public key $G_B=d_B G$. The verifier 506 may obtain the long-term key pair $(d_B, G_B)$ based on interactions with a certificate authority, or the verifier 506 may generate the long-term key pair $(d_B, G_B)$ independent of a certificate authority. The signer 502 may receive the verifier's long-term public key $G_B$ from the verifier 506 or from another source. The signer 502 may obtain the verifier's long-term public key $G_B$ from a digital certificate such as, for example, an implicit certificate issued by a certificate authority. In some implementations, there is no digital certificate associated with the verifier's long-term public key $G_B$.

At 510, the signer 502 obtains a message M. The message may be, or may include, any suitable data or information to be communicated to the verifier 506. For example, the message can include any suitable type of electronic document, data file, data object, or other form of information. In some cases, the message is an e-mail message, an electronic document, or an electronic data file that can be edited and rendered by appropriate software applications. In some cases, the message is a data message or a combination of data messages used in signaling applications among hardware components.

In the example shown in FIG. 5, the message $M=N_1\|N_2\|V$ includes three message parts: a first message part $N_1$, a second message part $N_2$, and a third message part V. In some instances, the signer 502 identifies the three message parts, for example, based on the size of the message, based on the content of the message, based on a parsing algorithm, or based on a combination of these and any other suitable criteria. In some instances, the message includes a different number of message parts. The signer 502 can incorporate a suitable degree of redundancy in the first message part $N_1$ or the second message part $N_2$ or both. In some implementations, the redundancy in the first message part $N_1$ and the redundancy in the second message part $N_2$ is sufficient, for example, for the verifier 506 to identify the redundancy in the corresponding message parts $N_1'$ and $N_2'$, for example, when $N_1'=N_1$ and $N_2'=N_2$.

At 512, the signer 502 obtains encoded messages parts $C_1$ and $C_2$. In the example shown in FIG. 5, the signer 502 obtains the encoded message parts $C_1$ and $C_2$ by computing a first elliptic curve point $Q=zG$, deriving a first key $K_1=KDF(Q)$ based on a key derivation function (KDF), computing a second elliptic curve point $Q_B=zG_B$, deriving a second key $K_2=KDF(Q_B)$ based on the key derivation function, and computing the encoded message parts $C_1=E(N_1, K_1)$, $C_2=E(N_2, K_2)$ based on an encoding function E. The integer z and the corresponding elliptic curve point Q can be considered a short-term (or "ephemeral") key pair (z, Q). The signer's short-term key pair (z, Q) may be obtained by any suitable technique. In some implementations, z is a random number in the interval [1, n−1] generated using a random number generator at the signer 402, and the corresponding elliptic curve point Q is generated by combining the integer z with the base point generator G. The elliptic curve point $Q_B$ is generated based on the short-term private key combined with the verifier's public key $G_B$. The keys $K_1$ and $K_2$ can be derived from the elliptic curve point Q using any suitable key derivation function. The encoded message parts $C_1$ and $C_2$ can be computed from the message parts $N_1$ and $N_2$ and the keys $K_1$ and $K_2$ using any suitable encoding function. For example, the encoding function can be, or it can include, an encryption function or another type of encoding function.

At 514, the signer 502 obtains a hash value e. In the example shown in FIG. 5, the signer 502 obtains the hash value e by evaluating a function $F(C_1\|C_2\|V)$ based on the first encoded message part $C_1$ concatenated with the second encoded message part $C_2$ concatenated with the third message part V. The hash value e can be generated using any appropriate hash function or hash-based function F, and the function F can be evaluated based on additional or different inputs, as appropriate. In some implementations, the function F is the hash-based function 200 shown in FIG. 2.

At 516, the signer 502 generates a signature part s. In the example shown in FIG. 5, the signer 502 obtains the signature part s by computing $s=z+d_Ae$ (mod n). (This equation can be modified, provided that there is a corresponding change to the operations performed by the verifier. As an example, the signature part s can be obtained at 516 by computing $s=z-d_Ae$ (mod n), and the operations performed by the verifier (e.g., to recover the message parts at 522) can be modified accordingly. Additional or different modifications may be made, as appropriate.) Here, z is the integer that the signer 502 used at 512 to produce the elliptic curve points Q and $Q_B$, $d_A$ is the signer's private key value, e is the hash value, and n is an integer representing the order of the base point generator G. The signature part s may be generated by any suitable technique.

At 518, the signer 502 sends the signed message to the verifier 506. In the example shown in FIG. 5, sending the signed message to the verifier 506 includes sending the signature part s, the encoded message parts $C_1$ and $C_2$, and the third message part V to the verifier 506. The data may be transmitted in any suitable manner, using any suitable hardware. In some implementations, the signed message is transmitted over a data network, over one or more wired or wireless links, etc. The signature part s, the encoded message parts $C_1$ and $C_2$, and the third message part V may be sent together or they may be sent separately, or they may be sent in any suitable combination. The data may be converted to an appropriate data format for transmission to the verifier 506. The verifier 506 receives the signed message from the signer 502.

At 520, the verifier 506 obtains the hash value e. In the example shown in FIG. 5, the verifier 506 generates the hash value e using the same function $F(C_1\|C_2\|V)$ that the signer 502 used to generate the hash value e, which was used in generating the signature part s at 516. The verifier 506 obtains the hash value e based on the encoded message parts $C_1$ and $C_2$ and the third message part V, which were all received from the signer 502. The verifier 506 may obtain the hash value e based on additional or different information, as appropriate.

At 522, the verifier 506 recovers two message parts $N_1'$ and $N_2'$. In the example shown in FIG. 5, the message parts $N_1'$ and $N_2'$ are recovered by computing a first elliptic curve point $Q'=sG-eG_A$, computing a second elliptic curve point $Q_B'=d_B[sG-eG_A]$, deriving a first key $K_1'=KDF(Q')$ based on the key derivation function KDF, deriving a second key $K_2'=KDF(Q_B')$ based on the key derivation function KDF, computing the first message part $N_1'=E^{-1}(C_1, K_1')$ based on the decoding function $E^{-1}$, and computing the second message part $N_2'=E^{-1}(C_2, K_2')$ based on the decoding function $E^{-1}$. The keys $K_1'$ and $K_2'$ are derived by evaluating the key derivation function KDF on the elliptic curve points Q' and $Q_B'$ respectively, and the message parts $N_1'$ and $N_2'$ are each computed by using the keys $K_1'$ and $K_2'$ to evaluate the decoding function $E^{-1}$ on the respective encoded message parts $C_1$ and $C_2$. Here, the verifier 506 uses the same key derivation function KDF that the signer 502 used to derive the keys $K_1$ and $K_2$; and the decoding function $E^{-1}$ used by the verifier 506 is the inverse of the encoding function E that was used by the signer 502 to calculate the encoded message parts $C_1$ and $C_2$. For example, if the signer 502 uses an encryption function to produce the encoded message parts $C_1$ and $C_2$, then the verifier 506 uses a corresponding decryption function to produce the message parts $N_1'$ and $N_2'$.

At 524, the verifier 506 verifies the recovered message parts $N_1'$ and $N_2'$. Verifying the recovered message parts $N_1'$ and $N_2'$ may indicate that the digital signature is authentic.

The recovered message parts $N_1'$ and $N_2'$ can be verified by any suitable technique. In some implementations, if $N_1'$ is recognized as a valid plaintext, then the recovered message part $N_1'$ is verified, and the digital signature may be considered authentic. The recovered message part $N_1'$ may be recognized as a valid plaintext, for example, if it contains the expected redundant information. In some implementations, if $N_2'$ is recognized as a valid plaintext, then the recovered message part $N_2'$ is verified and confidential. The recovered message part $N_2'$ may be recognized as a valid plaintext, for example, if decryption operation is successful, if it contains the expected redundant information, or both. In some implementations, $Q'=Q$, $Q_B'=Q_B$, $K_1'=K_1$, $K_2'=K_2$, $N_1'=N_1$, and $N_2'=N_2$, and therefore a recovered message $M'=N_1'\|N_2'\|V$ matches the sender's initial message $M=N_1\|N_2\|V$.

Subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on non-transitory computer storage medium for execution by, or to control the operation of, data processing apparatus. Alternatively or in addition, the program instructions can be encoded for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple cards, disks, or other storage devices).

Operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computing device or on multiple computers that are located at one site or distributed across multiple sites and interconnected by a communication network.

Processes and logic flows described in this specification can be performed by one or more programmable processors executing one or more computer programs to perform actions by operating on input data and generating output data. Processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computing device. Generally, a processor will receive instructions and data from a read-only memory or a random access memory or both. The essential elements of a computing device are a processor for performing actions in accordance with instructions and one or more memory devices for storing instructions and data. Generally, a computing device will also include, or be operatively coupled to receive data from or transfer data to, or both, one or more storage devices for storing data. However, a computing device need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, subject matter described in this specification can be implemented on a computer having a display device, e.g., an LCD (liquid crystal display) screen for displaying information to the user and a keyboard and a pointing device, e.g., touch screen, stylus, mouse, etc. by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computing device can interact with a user by sending documents to and receiving documents from a device that is used by the user.

Some of the subject matter described in this specification can be implemented in a computing system that includes a back-end component, e.g., as a data server, or that includes a middleware component, e.g., an application server, or that includes a front-end component, e.g., a client computing device having a graphical user interface, or any combination of one or more such back-end, middleware, or front-end components. The components of the system can be interconnected by any form or medium of digital data communication, e.g., a data network.

The computing system can include clients and servers. A client and server are generally remote from each other and typically interact through a data network. The relationship of client and server arises by virtue of computer programs running on the respective computers and having a client-server relationship to each other. In some implementations, a server transmits data to a client device. Data generated at the client device can be received from the client device at the server.

While this specification contains many specific implementation details, these should not be construed as limitations on the scope of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In a general aspect of what is described here, a hash value is generated. The hash value may be used, for example, in a cryptographic scheme.

In some aspects of what is described here, an implicit certificate associated with an entity is converted to a prefix-free value. A hash value is obtained by applying a hash function to the prefix-free value. A public key associated with the entity or a private key associated with the entity (or both) is generated based on the hash value. The public key or the private key (or both) can be used, for example, in cryptographic operations.

These and other aspects may include one or more of the following features. Converting the implicit certificate to a prefix-free value includes generating a first value that indicates a length of the implicit certificate, and producing the prefix-free value by prepending the first value to the implicit certificate. The implicit certificate is divided into multiple blocks, and the first value indicates a length of the implicit certificate in units of blocks. Or the first value indicates a length of the implicit certificates in units of bits, bytes, or other units.

Additionally or alternatively, these and other aspects may include one or more of the following features. The implicit certificate is divided into multiple blocks that include a first set of blocks and a last block. Converting the implicit certificate to a prefix-free value includes appending a zero bit to each block in the first set of blocks and appending a one bit to the last block. Converting the implicit certificate to a prefix-free value includes converting the implicit certificate to a format in which the implicit certificate has a predetermined length.

Additionally or alternatively, these and other aspects may include one or more of the following features. The public key associated with the entity is an elliptic curve point $Q_U$. Generating the public key associated with the entity includes extracting from the implicit certificate an elliptic curve point $P_U$ that represents a public key reconstruction value, accessing an elliptic curve point $Q_{CA}$ that represents a public key of a certificate authority that issued the implicit certificate, and computing the elliptic curve point $Q_U=eP_U+Q_{CA}$, where e is the hash value. The public key is used to encrypt a message to the entity. The public key is used to authenticate a message from the entity.

Additionally or alternatively, these and other aspects may include one or more of the following features. The private key associated with the entity is an integer $d_U$. Generating the private key associated with the entity includes accessing an integer $k_U$ that was used to generate a certificate request $R_U=k_UG$ (where G represents a base point generator), accessing an integer r that represents private key contribution data provided by the certificate authority that issued the implicit certificate, and computing the integer $d_U=ek_U+r$ (mod n), where e is the hash value. The private key is used to sign a message from the entity. The private key is used to decrypt a message to the entity.

Additionally or alternatively, these and other aspects may include one or more of the following features. The operations can be performed by any suitable entity in a cryptography system. The operations can be performed by data processing apparatus associated with the certificate authority that issued the implicit certificate; by data processing apparatus associated with the entity; or by data processing apparatus associated with a correspondent, other than the entity, that validates the public key based on the implicit certificate.

In some aspects of what is described here, a certificate authority generates an implicit certificate based on a request from an entity. The implicit certificate is converted to a prefix-free value. A hash value is obtained by applying a hash function to the prefix-free value. The certificate authority server generates private key contribution data for the entity based on the hash value. The certificate authority sends the private key contribution data and the implicit certificate to the entity.

These and other aspects may include one or more of the following features. The private key contribution data is an integer r. Generating the private key contribution data includes accessing an integer k that was used to generate a public key reconstruction value $P_U=R_U+kG$ (where $R_U$ is an elliptic curve point provided in the certificate request from the entity, and G is a base point generator), accessing an integer $d_{CA}$ that represents a private key of the certificate authority, and computing the integer $r=ek+d_{CA}$ (mod n), where e is the hash value.

Additionally or alternatively, these and other aspects may include one or more of the following features. The prefix-free value can be obtained based directly or indirectly on the implicit certificate or other input value. The public key or private key (or both) can be generated based directly or indirectly on the hash value. In some instances, the public key or private key (or both) can be generated indirectly on the hash value by: obtaining a second hash value based on the first hash value, and generating the public key or private key (or both) based directly on the second hash value. In some instances, the technique can be extended to include three, four or a larger number of functions applied in sequence.

In some aspects of what is described here, an entity generates a signature based on a message. The message to be signed is converted to a prefix-free value. A hash value is obtained by applying a hash function to the prefix-free value. A signature is generated based on the hash value and a private key of the entity. The signature is sent to a recipient.

In some aspects of what is described here, a message recipient verifies a digital signature. A signature and an associated message are received from an entity. A prefix-free value is generated based on the message. A hash value is obtained by applying a hash function to the prefix-free value. The signature is verified based on the hash value and a public key of the entity.

These and other aspects may include one or more of the following features. The prefix-free value is generated based on C∥V, an encoded message part concatenated with a second message part. The prefix-free value is generated based on $C_1 \| C_2 \| V$, a first encoded message part $C_1$ concatenated with a second encoded message part $C_2$ concatenated with a third message part V. The signature is an integer s generated based on the hash value e, the entity's long-term private key $d_A$ and the entity's short-term private key z. The signature is verified based on identifying redundancy in a recovered message part.

These and other aspects may include one or more of the following features. Converting the message to a prefix-free value includes generating a first value that indicates a length of the message, and producing the prefix-free value by prepending the first value to the message. The message is divided into multiple blocks, and the first value indicates a length of the message in units of blocks. Or the first value indicates a length of the message in units of bits, bytes, or other units.

Additionally or alternatively, these and other aspects may include one or more of the following features. The message is divided into multiple blocks that include a first set of blocks and a last block. Converting the message to a prefix-free value includes appending a zero bit to each block in the first set of blocks and appending a one bit to the last block. Converting the message to a prefix-free value includes converting the message to a format in which the implicit certificate has a predetermined length.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   accessing an implicit certificate associated with an entity;
   converting the implicit certificate to a prefix-free value in a prefix-free set, wherein none of the values in the prefix-free set is a prefix of any other value in the prefix-free set, wherein the converting comprises:
   generating a first value that indicates a length of the implicit certificate;
   dividing the implicit certificate into a plurality of blocks, wherein the first value indicates a length of the implicit certificate in units of blocks; and
   producing the prefix-free value by prepending the first value to the implicit certificate;
   obtaining a hash value by applying a hash function to the prefix-free value;
   generating, by data processing apparatus, a public key associated with the entity based on the hash value, wherein the public key is an elliptic curve point $Q_U$, and generating the public key includes:
   extracting from the implicit certificate an elliptic curve point $P_U$ that represents a public key reconstruction value;
   accessing an elliptic curve point $Q_{CA}$ that represents a public key of a certificate authority that issued the implicit certificate;
   computing the elliptic curve point $Q_U = eP_U + Q_{CA}$, where e is the hash value; and
   using the public key for cryptographic correspondence.

2. The method of claim 1, wherein the first value indicates a length of the implicit certificates in units of bytes.

3. The method of claim 1, wherein converting the implicit certificate to a prefix-free value comprises converting the implicit certificate to a format in which the implicit certificate has a predetermined length.

4. The method of claim 1, wherein using the public key for cryptographic correspondence comprises using the public key to encrypt a message to the entity.

5. The method of claim 1, wherein using the public key for cryptographic correspondence comprises using the public key to authenticate a message from the entity.

6. The method of claim 1, wherein the method is performed by data processing apparatus associated with the entity.

7. The method of claim 1, wherein the method is performed by data processing apparatus associated with a certificate authority that issued the implicit certificate.

8. The method of claim 1, wherein the method is performed by data processing apparatus associated with a correspondent, other than the entity, that validates the public key based on the implicit certificate.

9. A computer-implemented method comprising:
   accessing an implicit certificate associated with an entity;
   converting the implicit certificate to a prefix-free value in a prefix-free set, wherein none of the values in the prefix-free set is a prefix of any other value in the prefix-free set, wherein converting the implicit certificate to the prefix-free value comprises:
   dividing the implicit certificate into a plurality of blocks, the plurality of blocks including a first plurality of blocks and a last block;
   appending a zero bit to each of the first plurality of blocks; and
   appending a one bit to the last block; and
   obtaining a hash value by applying a hash function to the prefix-free value;
   generating, by data processing apparatus, a public key associated with the entity based on the hash value, wherein the public key is an elliptic curve point $Q_U$ and generating the public key includes:
   extracting from the implicit certificate an elliptic curve point $P_U$ that represents a public key reconstruction value;
   accessing an elliptic curve point $Q_{CA}$ that represents a public key of a certificate authority that issued the implicit certificate;
   computing the elliptic curve point $Q_U = eP_U + Q_{CA}$, where e is the hash value; and
   using the public key for cryptographic correspondence.

10. A computing system comprising:
    a hash module comprising computer-readable instructions on a computing device operable to:
    convert an implicit certificate to a prefix-free value in a prefix-free set, wherein none of the values in the prefix-free set is a prefix of any other value in the prefix-free set, and the implicit certificate is associated with an entity, wherein the hash module is operable to convert the implicit certificate to the prefix-free value by:
    generating a first value that indicates a length of the implicit certificate;

dividing the implicit certificate into a plurality of blocks, wherein the first value indicates a length of the implicit certificate in units of blocks; and producing the prefix-free value by prepending the first value to the implicit certificate; and obtain a hash value by applying a hash function to the prefix-free value; and a key generation module operable to generate a public key associated with the entity based on the hash value, wherein the public key is an elliptic curve point $Q_U$, and generating the public key includes:

extracting from the implicit certificate an elliptic curve point $P_U$ that represents a public key reconstruction value;

accessing an elliptic curve point $Q_{CA}$ that represents a public key of a certificate authority that issued the implicit certificate;

computing the elliptic curve point $Q_U=eP_U+Q_{CA}$, where e is the hash value; and using the public key for cryptographic correspondence.

11. The computing system of claim 10, wherein the hash module is operable to convert the implicit certificate to a prefix-free value by converting the implicit certificate to a format in which the implicit certificate has a predetermined length.

12. A computing system comprising:

a hash module comprising computer-readable instructions on a computing device operable to:

convert an implicit certificate to a prefix-free value in a prefix-free set, wherein none of the values in the prefix-free set is a prefix of any other value in the prefix-free set, and the implicit certificate is associated with an entity, wherein the hash module is operable to convert the implicit certificate to a prefix-free value by:

dividing the implicit certificate into a plurality of blocks, the plurality of blocks including a first plurality of blocks and a last block;

appending a zero bit to each of the first plurality of blocks; and appending a one bit to the last block; and obtain a hash value by applying a hash function to the prefix-free value; and a key generation module operable to generate a public key associated with the entity based on the hash value, wherein the public key is an elliptic curve point $Q_U$, and generating the public key includes:

extracting from the implicit certificate an elliptic curve point $P_U$ that represents a public key reconstruction value;

accessing an elliptic curve point $Q_{CA}$ that represents a public key of a certificate authority that issued the implicit certificate;

computing the elliptic curve point $Q_U=eP_U+Q_{CA}$, where e is the hash value; and using the public key for cryptographic correspondence.

13. A non-transitory computer-readable medium storing instructions that are operable when executed by data processing apparatus to perform operations comprising:

converting an implicit certificate to a prefix-free value in a prefix-free set, wherein none of the values in the prefix-free set is a prefix of any other value in the prefix-free set, and the implicit certificate is associated with an entity, wherein the converting comprises:

generating a first value that indicates a length of the implicit certificate;

dividing the implicit certificate into a plurality of blocks, wherein the first value indicates a length of the implicit certificate in units of blocks; and producing the prefix-free value by prepending the first value to the implicit certificate;

obtaining a hash value by applying a hash function to the prefix-free value;

generating a public key associated with the entity based on the hash value, wherein the public key is an elliptic curve point $Q_U$, and generating the public key includes:

extracting from the implicit certificate an elliptic curve point $P_U$ that represents a public key reconstruction value;

accessing an elliptic curve point $Q_{CA}$ that represents a public key of a certificate authority that issued the implicit certificate;

computing the elliptic curve point $Q_U=eP_U+Q_{CA}$, where e is the hash value; and using the public key for cryptographic correspondence.

14. The computer-readable medium of claim 13, wherein converting the implicit certificate to a prefix-free value comprises converting the implicit certificate to a format in which the implicit certificate has a predetermined length.

15. A non-transitory computer-readable medium storing instructions that are operable when executed by data processing apparatus to perform operations comprising:

converting an implicit certificate to a prefix-free value in a prefix-free set, wherein none of the values in the prefix-free set is a prefix of any other value in the prefix-free set, and the implicit certificate is associated with an entity, wherein converting the implicit certificate to the prefix-free value comprises:

dividing the implicit certificate into a plurality of blocks, the plurality of blocks including a first plurality of blocks and a last block;

appending a zero bit to each of the first plurality of blocks; and appending a one bit to the last block;

obtaining a hash value by applying a hash function to the prefix-free value;

generating a public key associated with the entity based on the hash value, wherein the public key is an elliptic curve point $Q_U$, and generating the public key includes:

extracting from the implicit certificate an elliptic curve point $P_U$ that represents a public key reconstruction value;

accessing an elliptic curve point $Q_{CA}$ that represents a public key of a certificate authority that issued the implicit certificate;

computing the elliptic curve point $Q_U=eP_U+Q_{CA}$, where e is the hash value; and using the public key for cryptographic correspondence.

* * * * *